US008333662B2

(12) United States Patent
Ohta

(10) Patent No.: US 8,333,662 B2
(45) Date of Patent: Dec. 18, 2012

(54) COMPUTER READABLE STORAGE MEDIUM HAVING A GAME PROGRAM STORED THEREON AND A GAME APPARATUS

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1218 days.

(21) Appl. No.: 11/987,724

(22) Filed: Dec. 4, 2007

(65) Prior Publication Data

US 2009/0093304 A1  Apr. 9, 2009

(30) Foreign Application Priority Data

Oct. 9, 2007 (JP) .................................. 2007-263638

(51) Int. Cl.
*A63F 13/00* (2006.01)
(52) U.S. Cl. .......................................................... 463/36
(58) Field of Classification Search ...................... 463/36
See application file for complete search history.

(56) References Cited

U.S. PATENT DOCUMENTS

| 5,524,637 | A | * | 6/1996 | Erickson ...................... 600/592 |
| 5,574,479 | A | | 11/1996 | Odell |
| 5,588,914 | A | * | 12/1996 | Adamczyk ...................... 463/32 |
| 5,627,565 | A | | 5/1997 | Morishita et al. |
| 5,816,913 | A | * | 10/1998 | Nakamura ...................... 463/6 |
| 6,261,179 | B1 | * | 7/2001 | Miyamoto et al. ............. 463/23 |
| 6,982,697 | B2 | | 1/2006 | Wilson et al. |
| 7,139,983 | B2 | | 11/2006 | Kelts |
| 7,158,118 | B2 | | 1/2007 | Liberty |
| 7,262,760 | B2 | | 8/2007 | Liberty |
| 7,292,151 | B2 | | 11/2007 | Ferguson et al. |
| 7,414,611 | B2 | | 8/2008 | Liberty |
| 7,713,126 | B2 | * | 5/2010 | Suzuki et al. .................... 463/31 |
| 2003/0216161 | A1 | * | 11/2003 | Busse et al. ........................ 463/6 |
| 2005/0096110 | A1 | * | 5/2005 | Ohyagi et al. .................... 463/6 |
| 2006/0084509 | A1 | * | 4/2006 | Novak et al. .................... 463/49 |

(Continued)

FOREIGN PATENT DOCUMENTS

JP  A-H06-165880  6/1994

OTHER PUBLICATIONS

Diddy Kong Racing Instruction Booklet, Nintendo 1997, retrieved at www.replacementdocs.com.*

(Continued)

*Primary Examiner* — Melba Bumgarner
*Assistant Examiner* — Anh Vo V Nguyen
(74) *Attorney, Agent, or Firm* — Nixon & Vanderhye P.C.

(57) ABSTRACT

An input device incorporating a motion sensor which detects a motion of the input device is worn on the body of a player, and in accordance with motion data detected by the input device, the player object is caused to move along a predetermined route on a course set in a virtual three-dimensional space. The course includes at least one branch point at which the course branches off into a plurality of routes. The motion data outputted from the motion sensor is successively acquired, and a moving speed of a player character is set in accordance with the motion data. Further, at the branch point on the course, a branching direction of the player object is set in accordance with the motion data. The player object is then caused to move along a route in the set branching direction at the set moving speed.

19 Claims, 16 Drawing Sheets

U.S. PATENT DOCUMENTS

| | | | |
|---|---|---|---|
| 2006/0135236 A1* | 6/2006 | Sato et al. | 463/6 |
| 2007/0265045 A1* | 11/2007 | Takai | 463/8 |
| 2008/0293465 A1* | 11/2008 | Chang | 463/7 |
| 2009/0273559 A1* | 11/2009 | Rofougaran et al. | 345/156 |

OTHER PUBLICATIONS

Perry, D., World's Scariest Police Chases. IGN.com game review [online], Jun. 8, 2001 [retrieved on Aug. 25, 2011]. Retrived from the Internet: < URL: http://psx.ign.com/articles/165/165040p1.html>.*

ADXL202 Specification Sheet: Low Cost ±2 g Dual Axis i MEMs® Accelerometer with Digital Output; Analog Devices, Inc., 1998.

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

SELECTECH Air Mouse, Description; retrieved on May 5, 2009 from http://cgi.ebay.com.my/ws/eBayISAPI.dll? ViewItem &item=350096666675&indexURL.

* cited by examiner

F I G. 1
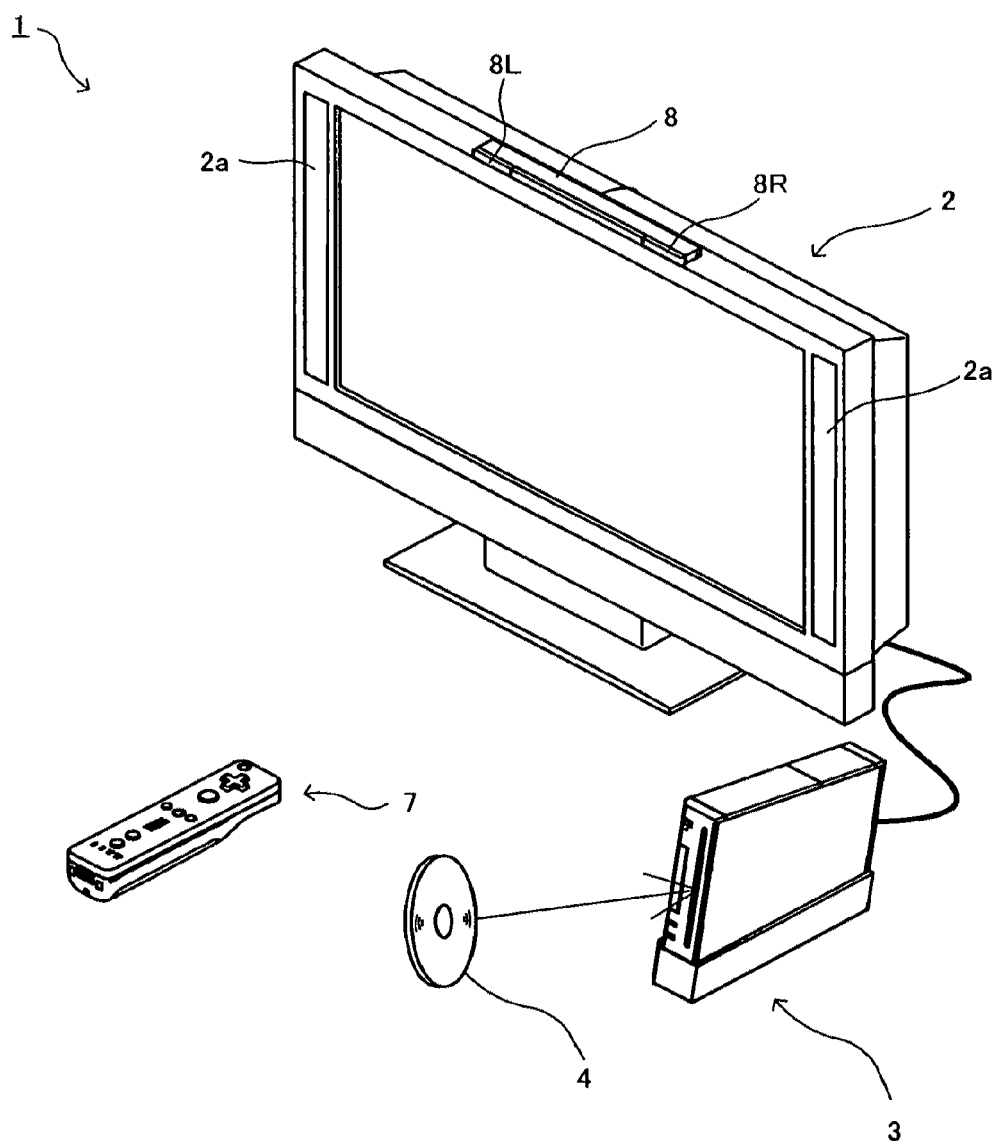

F I G. 3
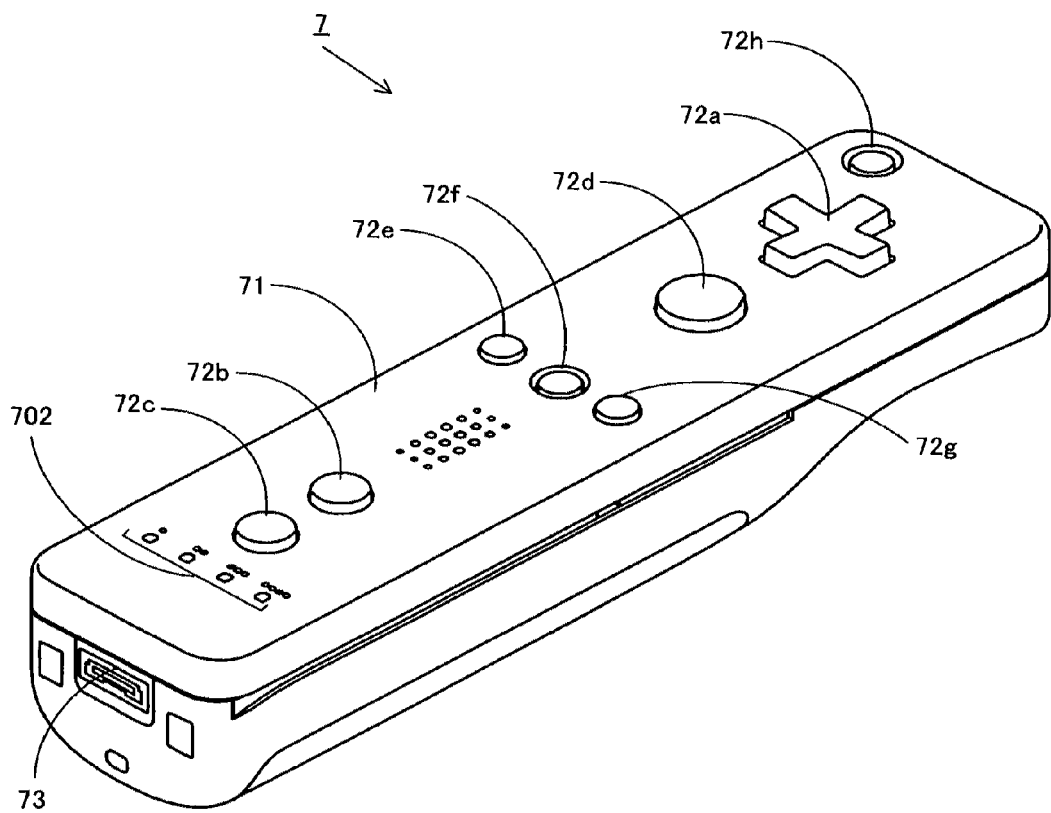
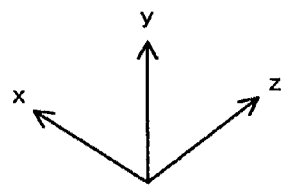

F I G. 4
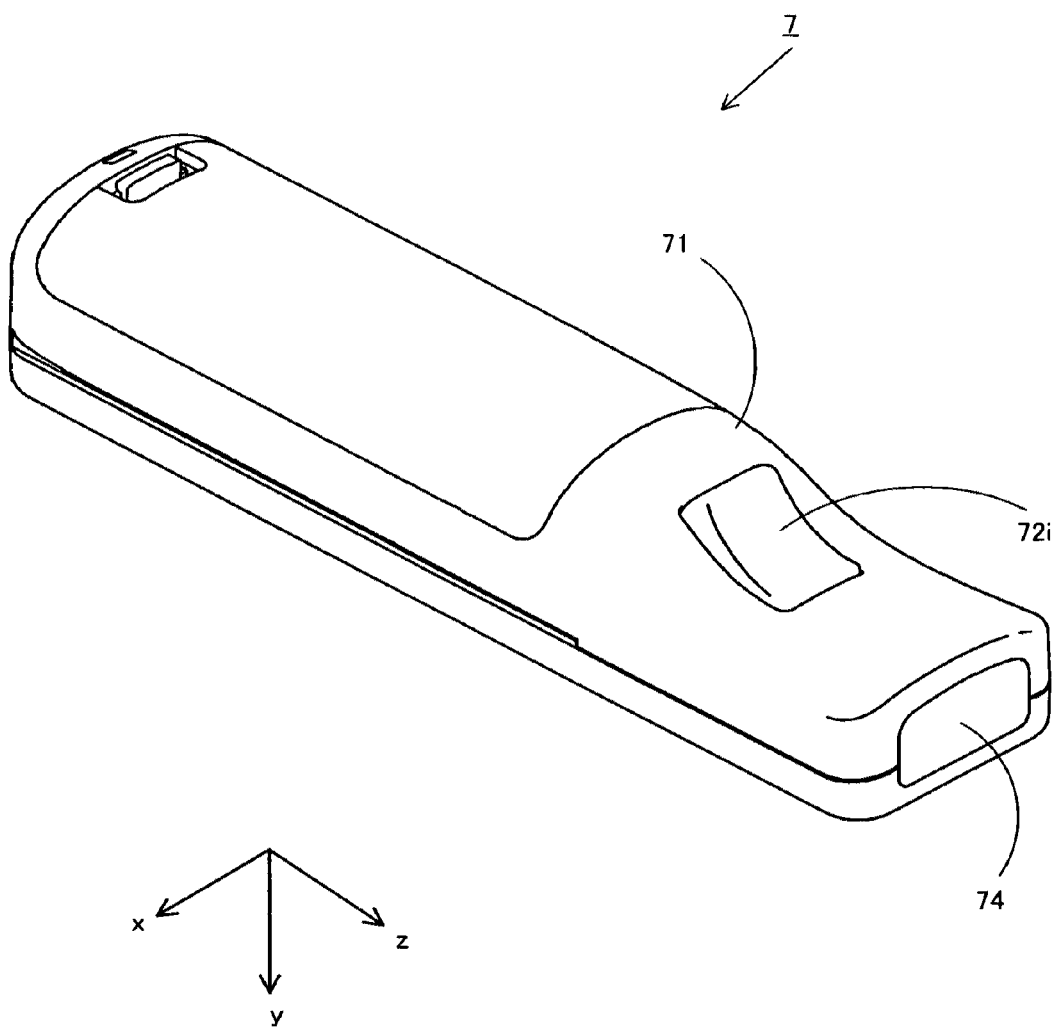

|  | ALIGNMENT SEQUENCE | | | |
|---|---|---|---|---|
| | 1251 | 2 | 3 | 1252 |
| COURSE NUMBER 1 | 1 | 2 | −1 | −1 |
| 2 | 1 | 3 | 4 | −1 |
| 3 | 1 | 3 | 5 | −1 |

| 1261 — BRANCHING CHARACTER NUMBER | 1 | 2 | ... |
|---|---|---|---|
| 1262 — COURSE NUMBER | 2 | 3 | ... |
| 1263 — OBJECT DATA | ... | ... | ... |

| 1271 — BRANCH POINT NUMBER | 1 | 2 | ... |
|---|---|---|---|
| 1272 — BRANCHING CHARACTER NUMBER | 1 | 2 | ... |

COMPUTER READABLE STORAGE MEDIUM HAVING A GAME PROGRAM STORED THEREON AND A GAME APPARATUS

CROSS REFERENCE TO RELATED APPLICATION

The disclosure of Japanese Patent Application No. 2007-263638, filed on Oct. 9, 2007, is incorporated herein by reference.

FIELD

The technology herein relates to a computer readable storage medium having a game program stored thereon and a game apparatus which use an input device including a motion sensor. More specifically, the technology herein relates to an operation of a player object in accordance with an output of the motion sensor.

BACKGROUND AND SUMMARY

Conventionally known video game apparatuses generally apply a method in which a controller is operated by a player's hand in order to operate a game executed by the game apparatus. For example, there is a controller which has a directional operation button arranged on the left side of a housing thereof, and also has a plurality of buttons arranged on the right side thereof. Generally, a player holds the controller with the player's both hands, presses the direction operation button with the player's left hand, and then presses any one of the plurality of buttons with the player's right hand.

There is also a case where a controller having a special shape is used for a game so as to realize a sense of assimilation between a content of the game and a playing state of the player. For example, a driving game apparatus is disclosed in which a controller having a steering wheel shape is used (e.g., Japanese Laid-Open Patent Publication No. 6-165880). In the game apparatus, the controller having the steering wheel shape is held by both hands of a player for steering control, whereby a sense of driving an automobile is provided to the player.

In the case of the game as disclosed in above-described patent document 1, the player needs to hold the controller with the player's hand(s) so as to operate the game regardless of the shape of the controller. However, in order to enhance a physical feeling of a player or reality of the game, a request for allowing the player to play a game without holding the controller with the player's hand is raised for some cases. For example, in the case of a jogging game, it is considered that the physical feeling of the player and the reality of the game can be improved when the player plays the game while performing a running behavior without holding anything with the player's hand compared to a case where the player plays the game with the controller held with the player's hand.

Therefore, certain example embodiments provide a game apparatus and a computer readable storage medium having a game program stored thereon which allow a player to enjoy a game without holding a controller with the player's hand.

Certain example embodiments may have the following features described herein. The reference numerals, additional explanations and the like in the parentheses indicate the correspondence with the embodiment described below in order to aid in understanding the embodiments and are not intended to limit, in any way, the scope of the present invention.

A first aspect is a computer readable storage medium having stored thereon a game program executed by a computer of a game apparatus (3) using an input device (7) which incorporates a motion sensor for detecting a motion of the input device and is worn on the body of a player, and displaying a player object moving along a predetermined route on a course, which is set in a virtual three-dimensional space, in accordance with motion data detected by the input device. The course includes at least one branch point at which the course branches off into a plurality of the routes. The game program causes the computer to function as motion data acquisition means (S11), moving speed setting means (S14, S18), branching direction setting means (S50), and player object moving means (S16). The motion data acquisition means successively acquires the motion data outputted by the motion sensor. The moving speed setting means sets a moving speed of the player object in accordance with the motion data acquired by the motion data acquisition means. The branching direction setting means sets a branching direction of the player object at the branch point on the course in accordance with the motion data acquired by the motion data acquisition means. The player object moving means causes the player object to move along the predetermined route on the course in accordance with the branching direction set by the branching direction setting means at the moving speed set by the moving speed setting means.

According to the first aspect, player can operate the player object without holding the input device with the player's hand. Accordingly, assimilation with and reality of a content of a game can be enhanced, and amusingness of the game can be increased.

In a second aspect based on the first aspect, the game program further causes the computer to function as non-player route setting means (S44) and non-player object moving means (S46). The non-player route setting means sets any one of the routes on the course as a non-player route along which a non-player object moves. The non-player object moving means causes the non-player object to move along the non-player route. The branching direction setting means further includes route setting means for setting a route, on which the player object is to move along when a predetermined condition is satisfied, as the non-player route.

According to the second aspect, it is possible to cause the player object to move in a predetermined branching direction at the branch point on the course.

In a third aspect based on the second aspect, the non-player object moving means locates the non-player object in the virtual three-dimensional space at a predetermined timing, and causes the non-player object to move along the non-player route.

According to the third aspect, the player can be informed of a timing when a course selection is possible.

In a fourth aspect based on the third aspect, the game program further causes the computer to function as branch point approach determination means for determining whether or not the player object has yet to arrive at or to pass through the branch point at which the course branches off and whether or not the player object exists in an area within a predetermined distance from the branch point. The non-player object moving means locates the non-player object at a position close to the player object when the player object is determined to exist in the area within the predetermined distance from the branch point.

According to the fourth aspect, since the non-player object does not appear until the player object approaches the branch point, it is possible to reduce a processing load.

In a fifth aspect based on the third aspect, the game program further causes the computer to function as non-player object elimination means for eliminating the non-player object, after the non-player object is located, when a distance between the non-player object and the player object becomes equal to or greater than a predetermined value.

According to the fifth aspect, after the non-player object appears, when a distance between the non-player object and the player object becomes far apart, the non-player object is eliminated. Therefore, the processing load can be reduced.

In a sixth aspect based on the third aspect, the non-player route setting means sets a plurality of different non-player routes. The non-player object moving means causes the non-player objects, respectively having various visual appearances, to respectively move along the different non-player routes which are set by the non-player route setting means.

According to the sixth aspect, various non-player objects can be caused to appear, and accordingly amusingness of the game can be increased.

In a seventh aspect based on the second aspect, the branching direction setting means further includes change condition determination means for determining whether or not a state, in which the distance between the player object and the non-player object in the virtual three-dimensional space is equal to or less than a predetermined distance, continues for a predetermined time period. The predetermined condition is that the change condition determination means determines the state continues for the predetermined time period.

According to the seventh aspect, the player can select a branching direction desired by the player at the branch point on the course without operating the input device with the player's hand. Accordingly, it is possible to prevent the reality of the game from being harmed compared to a case where a course selection is performed by hand operation.

In an eighth aspect based on the seventh aspect, the non-player object moving means locates the non-player object in the virtual three-dimensional space at a predetermined timing, and causes the non-player object to move along the non-player route.

According to the eighth aspect, the player can be informed of a timing when a course selection is possible.

In a ninth aspect based on the eighth aspect, the game program further causes the computer to function as branch point approach determination means for determining whether or not the player object has yet to arrive at or to pass through the branch point at which the course branches off and whether or not the player object exists in an area within a predetermined distance from the branch point. The non-player object moving means locates the non-player object at a position close to the player object when the player object is determined to exist in the area within the predetermined distance from the branch point.

According to the ninth aspect, since the non-player object does not appear until the player object approaches the branch point, it is possible to reduce the processing load.

In a tenth aspect based on the eighth aspect, the game program further causes the computer to function as non-player object elimination means (S48) for eliminating the non-player object, after the non-player object is located, when a distance between the non-player object and the player object becomes equal to or greater than a predetermined value.

According to the tenth aspect, after the non-player object appears, when the distance between the non-player object and the player object becomes far apart, the non-player object is eliminated. Therefore, the processing load can be reduced.

In an eleventh aspect based on the eighth aspect, the non-player route setting means sets a plurality of different non-player routes. The non-player object moving means causes the non-player objects, respectively having various visual appearances, to respectively move along the different non-player routes which are set by the non-player route setting means.

According to the eleventh aspect, various non-player objects can be caused to appear, and accordingly amusingness of the game can be increased.

In a twelfth aspect based on the seventh aspect, the game program further causes the computer to function as player route setting means for setting any one of the routes on the course as a player route along which the player object moves. The player route setting means changes the player route to the non-player route when a determination made by the change condition determination means is positive.

According to the twelfth aspect, the player can change the course to which the player is to move forward without operating the input device with the player's hand. Accordingly, it is possible to prevent the reality of the game from being harmed compared to a case where the course change is performed by the hand operation.

In a thirteenth aspect based on the twelfth aspect, the non-player object moving means locates the non-player object in the virtual three-dimensional space at a predetermined timing, and causes the non-player object to move along the non-player route.

According to the thirteenth aspect, the player can be informed of a timing when a course selection is possible.

In a fourteenth aspect based on the thirteenth aspect, the game program further causes the computer to function as branch point approach determination means (S42) for determining whether or not the player object has yet to arrive at or to pass through the branch point at which the course branches off and whether or not the player object exists in an area within a predetermined distance from the branch point. The non-player object moving means locates the non-player object at a position close to the player object when the player object is determined to exist in the area within the predetermined distance from the branch point.

According to the fourteenth aspect, since the non-player object does not appear until the player object approaches the branch point, it is possible to reduce the processing load.

In a fifteenth aspect based on the thirteenth aspect, the game program further causes the computer to function as non-player object elimination means (S48) for eliminating the non-player object, after the non-player object is located, when a distance between the non-player object and the player object becomes equal to or greater than a predetermined value.

According to the fifteenth aspect, after the non-player object appears, when the distance between the non-player object and the player object becomes far apart, the non-player object is eliminated. Therefore, the processing load can be reduced.

In a sixteenth aspect based on the thirteenth aspect, the non-player route setting means sets a plurality of different non-player routes. The non-player object moving means causes the non-player objects, respectively having various visual appearances, to respectively move along the different non-player routes which are set by the non-player route setting means.

According to the sixteenth aspect, various non-player objects can be caused to appear, and accordingly amusingness of the game can be increased.

In a seventeenth aspect based on the first aspect, the moving speed setting means sets the moving speed so as to increase in accordance with an increase in an oscillation frequency per unit time which is calculated based on the motion data.

In an eighteenth aspect based on the eleventh aspect, the motion sensor is an acceleration sensor. The moving speed setting means calculates the oscillation frequency per unit time which is calculated based on a magnitude of an acceleration in a gravity direction outputted from the acceleration sensor.

According to the seventeenth to eighteenth aspects, the moving speed of the player object can be changed depending on a degree of a strenuous movement performed by the player. Accordingly, the player can play the game without feeling a sense of incongruity.

A nineteenth aspect is a game apparatus using an input device (7) which incorporates a motion sensor for detecting a motion of the input device and is worn on the body of a player, and displaying a player object moving along a predetermined route on a course, which is set in a virtual three-dimensional space, in accordance with motion data detected by the input device. The course including at least one branch point at which the course branches off into a plurality of the routes. The game apparatus comprises motion data acquisition means (10), moving speed setting means (10), branching direction setting means (10), and player object moving means (10). The motion data acquisition means successively acquires the motion data outputted by the motion sensor. The moving speed setting means sets a moving speed of the player object in accordance with the motion data acquired by the motion data acquisition means. The branching direction setting means sets a branching direction of the player object at the branch point on the course in accordance with the motion data acquired by the motion data acquisition means. The player object moving means causes the player object to move along the predetermined route on the course in accordance with the branching direction set by the branching direction setting means at the moving speed set by the moving speed setting means.

According to the nineteenth aspect, the same effect as the first aspect can be attained.

According to certain example embodiments, it is possible to control the player object without causing the player to hold and control the input device with the player's hand.

These and other objects, features, aspects and advantages of certain example embodiments will become more apparent from the following detailed description when taken in conjunction with the accompanying drawings.

BRIEF DESCRIPTION OF THE DRAWINGS

FIG. 1 is an external view illustrating a game system according to one embodiment;

FIG. 3 is a perspective view of the controller 7 as viewed from a top rear side thereof shown in FIG. 1;

FIG. 4 is a perspective view of the controller 7 as viewed from a bottom front side thereof shown in FIG. 3;

FIG. 14 is a diagram showing an exemplary data configuration of a block table 125;

FIG. 15 is a diagram showing an exemplary data configuration of a branching character table 126;

FIG. 16 is a diagram showing an exemplary data configuration of a branch point correspondence table 127;

DETAILED DESCRIPTION

Overall Configuration of Game System

Figure 2:
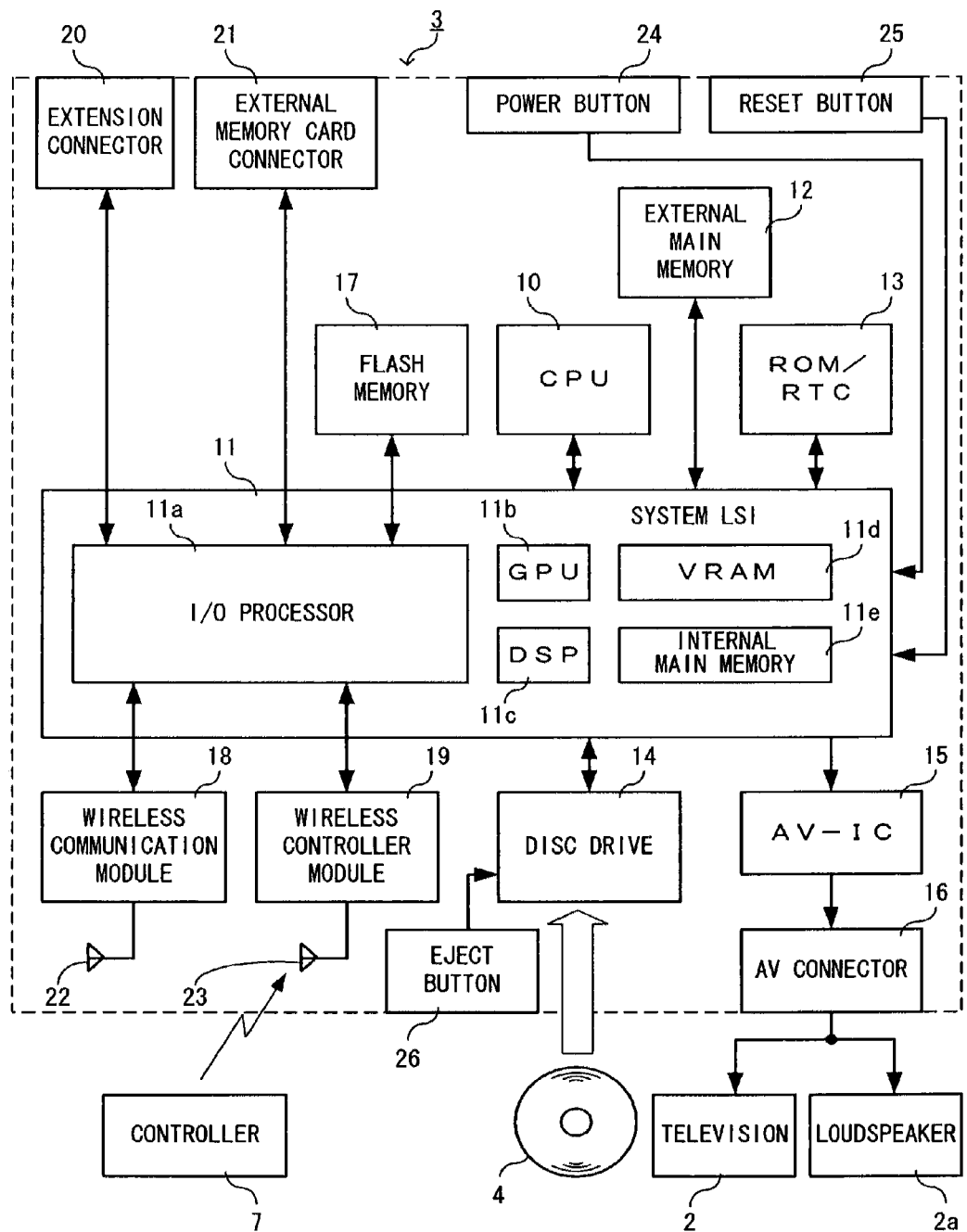
FIG. 2 is a functional block diagram of a game apparatus 3 shown in FIG. 1.

With reference to FIG. 1, a game system 1 including a game apparatus according to certain example embodiments will be described. FIG. 1 is an external view of the game system. Hereinafter, the game apparatus and a game program of the present embodiment will be described by using a stationary game apparatus as an example. As shown in FIG. 1, the game system 1 includes a television receiver (hereinafter simply referred to as a television) 2, a game apparatus 3, an optical disc 4, a controller 7, and a marker section 8. The present system causes the game apparatus 3 to execute a game process in accordance with a game operation using the controller 7.

The game apparatus 3 has detachably mounted therein an optical disc 4 which is an exemplary information storage medium exchangeably used for the game apparatus 3. The optical disc 4 has stored thereon a game program executed by the game apparatus 3. An insertion slot for receiving the optical disc 4 is provided on the front surface of the game apparatus 3. The game apparatus 3 executes a game process by reading and executing a game program stored on the optical disc 4 which is inserted through the insertion slot.

To the game apparatus 3, the television 2 typifying a display device is connected via a connection cord. On the television 2, a game image obtained as a result of the game process executed by the game apparatus 3 is displayed. Further, on the periphery of a screen of the television 2 (an upper side of the screen shown in FIG. 1), the marker section 8 is provided. The marker section 8 has two markers 8R and 8L located at both ends thereof. The marker 8R (as well as the marker 8L) is specifically composed of one or more infrared LEDs, and outputs infrared light forward from the television 2. The marker section 8 is connected to the game apparatus 3, and the game apparatus 3 is capable of controlling lighting of the respective red infrared LEDs contained in the marker section 8.

The controller 7 is an input device for providing the game apparatus 3 with operation data indicative of a content of an operation applied to the controller 7. The controller 7 and the game apparatus 3 are connected to each other through wireless communication. In the present embodiment, a technique of Bluetooth (registered trademark), for example, is used for the wireless communication between the controller 7 and the game apparatus 3. In another embodiment, the controller 7 and the game apparatus 3 may be connected to each other via a fixed line.

(Internal Configuration of Game Apparatus 3)

Next, with reference to FIG. 2, an internal configuration of the game apparatus 3 will be described. FIG. 2 is a block diagram showing a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game process by causing the game program stored on the optical disc 4 to be executed, and functions as a game processor. The CPU 10 is connected to the system LSI 11. In addition to the CPU 10, the system LSI 11 is connected to the external main memory 12, the ROM/RTC 13, the disc drive 14, and the AV-IC 15. The system LSI 11 performs processing such as control of data transmission among respective component parts connected thereto, generation of an image to be generated, and acquisition of data from an external apparatus. An internal configuration of the system LSI will be described later. The external main memory 12, which is of a volatile type, stores programs such as a game program, which is read from the optical disc 4 or a flash memory 17, and other various data. The external main memory 12 is used as a work area and a buffer space for the CPU 10. The ROM/RTC 13 includes a ROM (so-called a boot ROM) incorporating a program for booting the game apparatus 3, and a clock circuit for counting time (RTC: Real Time Clock). The disc drive 14 reads program data, texture data and the like from the optical disc 4, and writes the read data into an internal main memory 11e described later or the external main memory 12.

Further, provided to the system LSI 11 are an input/output (I/O) processor 11a, a GPU (Graphics Processor Unit) 11b, a DSP (Digital Signal Processor) 11c, a VRAM 11d, and the internal main memory 11e. These component parts 11a, 11b, 11c, 11d, and 11e are, though not shown in diagrams, connected to one another via an internal bus.

The GPU 11b forms a part of a drawing means, and generates an image in accordance with a graphics command (draw command) from the CPU 10. More specifically, the GPU 11b generates game image data by performing, in accordance with the graphics command, calculation processing, which is necessary to display 3D graphics, such as coordinate conversion from 3D coordinates to 2D coordinates, which corresponds to processing before rendering, and final rendering processing including texture pasting and the like. Here, in addition to the graphics command, the CPU 10 provides an image generation program necessary to generate the game image data to the GPU 11b. The VRAM 11d stores data (such as polygon data and the texture data) necessary for the GPU 11b to execute the graphics command. When an image is generated, the GPU 11b generates the image data by using the data stored in the VRAM 11d.

The DSP 11c functions as an audio processor, and generates audio data by using sound data and sound waveform (tone quality) data stored in the internal main memory 11e and the external main memory 12. Further, as with the external main memory 12, the internal main memory 11e may be used to store programs and various data, or may be used as the work area or the buffer space.

The image data and the audio data generated as above described are read by the AV-IC 15. The AV-IC 15 outputs the read image data to the television 2 via an AV connector 16, and also outputs the read audio data to a loudspeaker 2a embedded in the television 2. Accordingly, the image is displayed on the television 2, and the sound is outputted from the loudspeaker 2a.

The I/O processor 11a executes data transmission with component parts connected thereto and also executes data downloading from an external apparatus. The I/O processor 11a is connected to the flash memory 17, a wireless communication module 18, a wireless controller module 19, an extension connector 20, and an external memory card connector 21. An antenna 22 is connected to the wireless communication module 18, and an antenna 23 is connected to the wireless controller module 19.

The I/O processor 11a is connected to a network via the wireless communication module 18 and the antenna 22, and is capable of communicating with other game apparatuses and various servers connected to the network. The I/O processor 11a accesses the flash memory 17 at regular intervals so as to detect data, if any, which is necessary to transmit to the network. If the data is detected, the detected data is transmitted to the network via the wireless communication module 18 and the antenna 22. Further, the I/O processor 11a receives data transmitted from the other game apparatuses and data downloaded from a download server via the network, the antenna 22, and the wireless communication module 18, and stores the received data in the flash memory 17. The CPU 10 executes the game program so as to read the data stored in the flash memory 17, and causes the game program to use the read data. In the flash memory 17, not only data transmitted between the game apparatus 3 and the other game apparatuses or the various servers, but also save data of a game (result data or midstream data of the game) played by using the game apparatus 3 may be stored.

Further, the I/O processor 11a receives the operation data, which is transmitted from the controller 7, via the antenna 23 and the wireless controller module 19, and (temporarily) stores the operation data in the internal main memory 11e or in the buffer space of the external main memory 12.

Further, to the I/O processor 11a, the extension connector 20, and the external memory card connector 21 are connected. The extension connector 20 is an interface connector as typified by a USB and a SCSI, and is capable of performing communication with the network, instead of the wireless communication module 18, by connecting thereto a medium such as an external storage medium, a peripheral device such as another controller, or a wired communication connector. The external memory card connector 21 is a connector for connecting the external storage medium such as the memory card. For example, the I/O processor 11a accesses the external storage medium via the extension connector 20 or the external memory card connector 21, and then saves data or reads data.

Provided to the game apparatus 3 are a power button 24, a reset button 25, and an eject button 26. The power button 24 and the reset button 25 are connected to the system LSI 11. When the power button 24 is turned on, the power is supplied to the respective component parts of the game apparatus 3 via an AC adopter which is not shown. Further, when the power button 24 is pressed again while the power is on, the state of the game apparatus 3 shifts to a low-power standby mode. Since the power is supplied to the game apparatus 3 even in such a state, the game apparatus 3 can be constantly connected to the network such as the Internet. In the case of turning off the power after the power is turned on, the power can be turned off by holding the power button 24 down for a predetermined time period or longer. When the reset button 25 is pressed, the system LSI 11 reactivates a start-up program of the game apparatus 3. The eject button 26 is connected to the disc drive 14. When the eject button 26 is pressed, the optical disc 4 is ejected from the disc drive 14.

Next, with reference to FIGS. 3 and 4, the controller 7 will be described. FIG. 3 is a perspective view of the controller 7 as viewed from a top rear side thereof FIG. 4 is a perspective view of the controller 7 as viewed from a bottom front side thereof.

As shown in FIGS. 3 and 4, the controller 7 includes a housing 71, and an operation section composed of a plurality of operation buttons provided on the surface of the housing 71. The housing 71 of the present embodiment has a substantially parallelepiped shape extending in a longitudinal direction from front to rear, and an overall size thereof is small enough to be held by one hand of an adult or even a child. The housing 71 is formed by, for example, plastic molding.

At a front center portion of a top surface of the housing 71, a cross key 72$a$ is provided. The cross key 72$a$ is a cross-shaped four-direction push switch, and the operation portions thereof are respectively located on cross-shaped projecting portions arranged at intervals of 90 degrees such that the operation portions correspond to four directions (front, rear, right and left). A player selects one of the front, rear, right, and left directions by pressing one of the operation portions of the cross key 72$a$. Through an operation of the cross key 72$a$, the player can, for example, indicate a direction in which a player character or the like appearing in a virtual game world is to move, or select an instruction from a plurality of choices.

The cross key 72$a$ is an operation section for outputting an operation signal in accordance with the above-described direction input operation performed by the player, and such an operation section may be provided in another form. For example, the operation section may be such that four push switches are arranged in the cross directions and an operation signal is outputted by the player's pressing one of the four push switches. Further, in addition to the four push switches, a center switch may be provided at a crossing position of the above-described cross directions so as to provide an operation section composed of the four push switches and the center switch. Alternatively, the cross key 72$a$ may be replaced with an operation section which includes an inclinable stick (so called a joystick) projecting from the top surface of the housing 71 and which outputs the operation signal in accordance with an inclining direction of the stick. Still alternatively, the cross key 72$a$ may be replaced with an operation section which includes a disc-shaped member horizontally slidable and which outputs an operation signal in accordance with a sliding direction of the disc-shaped member. Still alternatively, the cross key 72$a$ may be replaced with a touchpad.

Behind the cross key 72$a$ on the top surface of the housing 71, a plurality of operation button 72$b$, 72$c$, 72$d$, 72$e$, 72$f$ and 72$g$ are provided. The operation buttons 72$b$, 72$c$, 72$d$, 72$e$, 72$f$ and 72$g$ are each an operation section for outputting an operation signal assigned thereto when the player presses a head thereof. For example, functions such as a NO. 1 button, a No. 2 button, an A button and the like are assigned to the operation buttons 72$b$, 72$c$ and 72$d$. Further, functions such as a minus button, a home button, a plus button and the like are assigned to the operation buttons 72$e$, 72$f$ and 72$g$. Various functions are assigned to these operation buttons 72$a$, 72$b$, 72$c$, 72$d$, 72$e$, 72$f$ and 72$g$ in accordance with the game program executed by the game apparatus 3. In an exemplary arrangement shown in FIG. 3, the operation buttons 72$b$, 72$c$ and 72$d$ are arranged in a line at the center in a front-rear direction on the top surface of the housing 71. Further, the operation buttons 72$e$, 72$f$ and 72$g$ are arranged in a line on the top surface of the housing 71 in a left-right direction between the operation buttons 72$b$ and 72$d$. The operation button 72$f$ has a top surface thereof buried in the top surface of the housing 71, so as not to be inadvertently pressed by the player.

In front of the cross key 72$a$ on the top surface of the housing 71, an operation button 72$h$ is provided. The operation button 72$h$ is a power switch for turning on and off the power to the game apparatus 3 by remote control. The operation button 72$h$ also has a top surface thereof buried in the top surface of the housing 71, so as not to be inadvertently pressed by the player.

Behind the operation button 72$c$ on the top surface of the housing 71, a plurality of LEDs 702 are provided. A controller type (number) is assigned to the controller 7 such that the controller 7 is distinguishable from another controller 7. Here, the LEDs 702 are used for, for example, informing the player about the controller type currently set for the controller 7. Specifically, when the controller 7 transmits transmission data to the game apparatus 3, one of the plurality of LEDs 702 which corresponds to the controller type of the controller 7 is lit up.

On the top surface of the housing 71, loudspeaker holes for emitting a sound from a loudspeaker (a loudspeaker 706 shown in FIG. 5), which is to be described later, are formed between the operation button 72$b$ and the operation buttons 72$e$, 72$f$ and 72$g$.

On a bottom surface of the housing 71, a recessed portion is formed. As described later in detail, the recessed portion on the bottom surface of the housing 71 is formed in a position in which an index finger or middle finger of the player is located when the player holds the controller 7 with one hand and points a front portion thereof to the markers 8L and 8R. On a slope surface of the recessed portion, an operation button 72$i$ is provided. The operation button 72$i$ is an operation section acting as, for example, a B button.

On a front side surface of the housing 71, an image pickup element 743 constituting a part of an imaging information calculation section 74 is provided. The imaging information calculation section 74 is a system for analyzing image data picked up by the controller 7, thereby identifying an area having a high brightness in the image and detecting a position of a gravity center, a size and the like of the area. The imaging information calculation section 74 has, for example, a maximum sampling period of about 200 frames/sec., and thus can trace and analyze even a relatively fast motion of the controller 7. A configuration of the imaging information calculation section 74 will be described later in detail. On a rear side surface of the housing 71, a connector 73 is provided. The connector 73 is, for example, an edge connector, and is used for coupling and connecting the controller 7 with a connection cable.

For the sake of a specific description, a coordinate system set for the controller 7 will be defined. As shown in FIGS. 3 and 4, an x-axis, a y-axis and z-axis respectively running at right angles to one another are defined with respect to the controller 7. Specifically, the z-axis represents a longitudinal direction of the housing 71, which corresponds to the front-rear direction of the controller 7, and a direction on the side of the front side surface (a surface on which the (imaging information calculation section 74 is provided) of the controller 7 is set as a z-axis positive direction. Further, the y-axis represents an up-down direction of the controller 7, and a direction on the side of the top surface of the housing 71 (a surface on which the (operation button 72$a$ is provided) is set as a y-axis positive direction. Still further, the x-axis represents the left-right direction of the controller 7, and a direction on the left side (a side which is not shown in FIG. 3, but shown in FIG. 4) of the housing is set as an x-axis positive direction.

Figure 5:
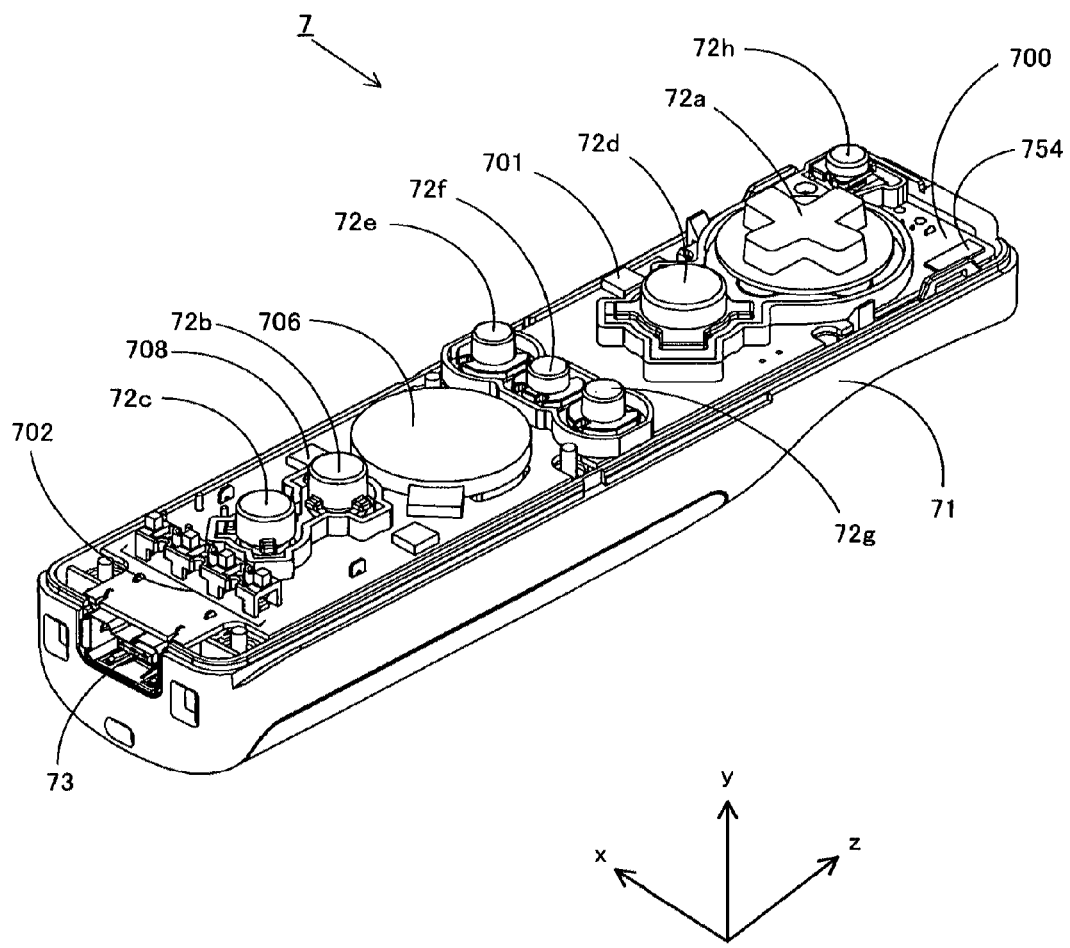
FIG. 5 is a perspective view of the controller 7 shown in FIG. 3 in a state where an upper housing thereof is removed.
Figure 6:
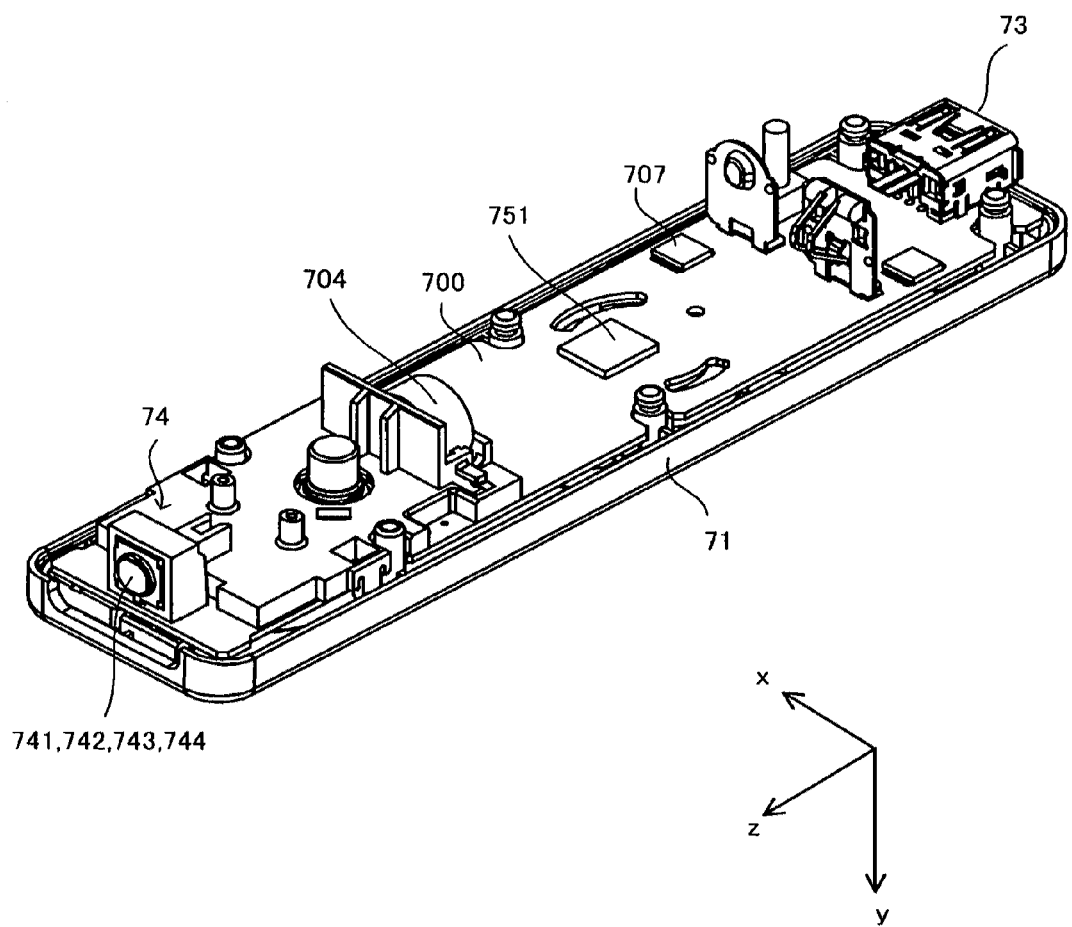
FIG. 6 is a perspective view of the controller 7 shown in FIG. 3 in a state where a lower housing there of is removed.

With reference to FIGS. 5 and 6, an internal structure of the controller 7 will be described. FIG. 5 is a perspective view of the controller 7 in a state where an upper housing (a part of the housing 71) of the controller 7 is removed. FIG. 6 is a perspective view of the controller 7 in a state where a lower housing (a part of the housing 71) of the controller 6 is removed. FIG. 6 is a perspective view of a substrate 700 as viewed from a reverse side of the substrate 700 shown in FIG. 5.

As shown in FIG. 5, the substrate 700 is fixed inside the housing 71. Provided on a top main surface of the substrate 700 are the operation buttons 72a, 72b, 72c, 72d, 72e, 72f, 72g and 72h, an acceleration sensor 701, the LEDs 702, an antenna 754 and the like. These elements are connected to a microcomputer 751 or the like (see FIGS. 6 and 7) by lines (not shown) formed on the substrate 700 or the like. The microcomputer 751 functions as exemplary button data generation means in certain example embodiments, and generates operation button data corresponding to the type of the operation button 72a or the like. This function is a technique in the public domain, and realized by the microcomputer 751 detecting connection/disconnection of lines which is caused by a switch mechanism such as a tactile switch located at a lower side of a key top. More specifically, when the operation button is pressed, for example, the lines are connected, and consequently energized. The microcomputer 751 detects the lines which are energized, and generates a signal corresponding to the type of the operation button.

The wireless module 753 (see FIG. 7) and the antenna 754, which are not shown, allow the controller 7 to act as a wireless controller. A quartz oscillator, which is not shown, is provided in an inside of the housing 71, and generates a reference clock of the microcomputer 751 described later. On the top main surface of the substrate 700, the loudspeaker 706 and an amplifier 708 are provided. The acceleration sensor 701 is provided at the left side of the operation button 72d on the substrate 700 (that is, at a peripheral portion, instead of a center portion, on the substrate 700). Accordingly, the acceleration sensor 701 can detect, in accordance with a rotation centering on the longitudinal direction of the controller 7, acceleration caused by a centrifugal force element as well as directional variation in gravity acceleration. Accordingly, the game apparatus 3 and the like can detect, from the detected acceleration data, the rotation of the controller 7 highly sensitively in accordance with a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front side of the controller 7. These elements are attached to the bottom main surface of the substrate 700. At a rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 by lines formed on the substrate 700 and the like, and outputs a audio signal to the loudspeaker 706 via the amplifier 708 in accordance with the sound data transmitted from the game apparatus 3.

On the bottom main surface of the substrate 700, a vibrator 704 is attached. The vibrator 704 may be, for example, a vibration motor or a solenoid. The vibrator 704 is connected to the microcomputer 751 via the lines formed on the substrate 700 and the like, and is turned on/off in accordance with vibration data transmitted from the game apparatus 3. The controller 7 is vibrated when the vibrator 704 is turned on, and vibration is conveyed to the player holding the controller 7. Thus, so-called a vibration-feedback game is realized. The vibrator 704 is located at a relatively front side of the housing 71, and thus the housing 71 vibrates to a large extent while the player is holding the housing 71, whereby the player feels vibration sensitively.

Figure 7:
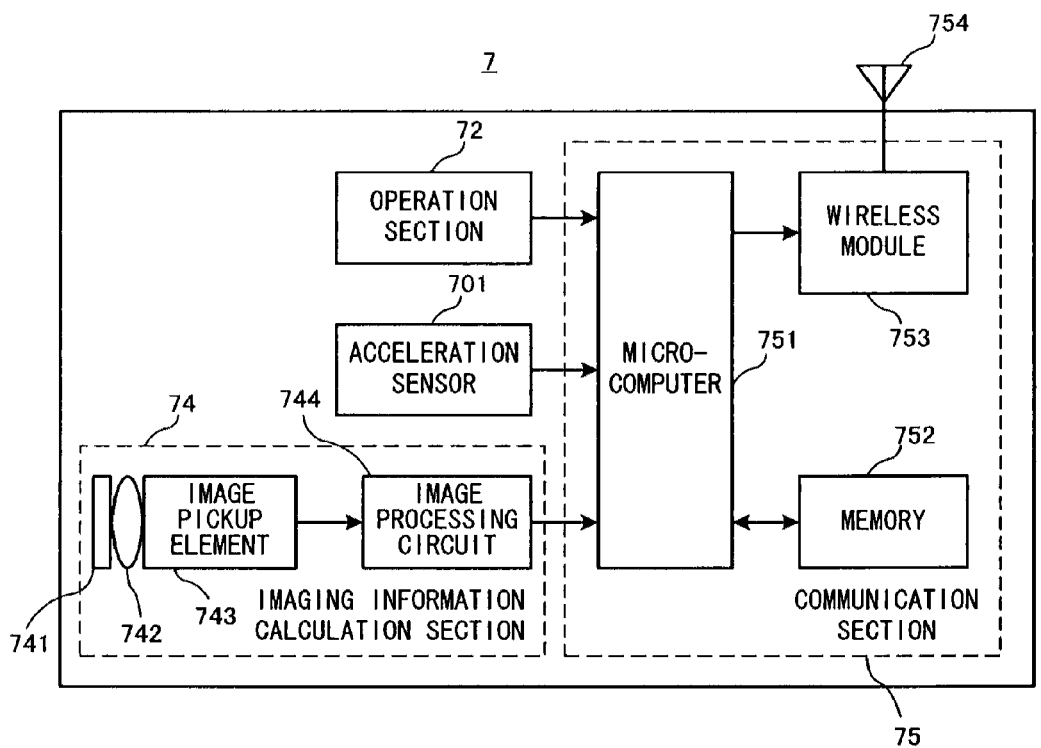
FIG. 7 is a block diagram showing a configuration of the controller 7 shown in FIG. 3.

With reference to FIG. 7, an internal configuration of the controller 7 will be described. FIG. 7 is a block diagram showing a configuration of the controller.

As shown in FIG. 7, the controller 7 includes thereinside a communication section 75 as well as the operation section 72, the imaging information calculation section 74, the acceleration sensor 701, the vibrator 704, the loudspeaker 706, the sound IC 707 and the amplifier 708 which are descried above.

The imaging information calculation section 74 includes the infrared filter 741, the lens 742, the image pickup element 743 and the image processing circuit 744. The infrared filter 741 allows only an infrared radiation in the light incident on the front side of the controller 7 to pass therethrough. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an image of the infrared radiation converged by the lens 742. In other words, the image pickup element 743 picks up the image of only the infrared radiation having passed through the infrared filter 741, and generates image data. The image data generated by the image pickup element 743 is processed by the image processing circuit 744. Specifically, the image processing circuit 744 processes the image data obtained from the image pickup element 743 and detects a high brightness position thereof, and outputs, to the communication section 75, a process result data indicative of a result of the detection of a position coordinate point and an area of the high brightness position. The imaging information calculation section 74 is fixed on the housing 71 of the controller 7, and an imaging direction of the housing 71 can be changed by changing the orientation of the housing 71. As will be described later, in accordance with the process result data outputted from the imaging information calculation section 74, a signal corresponding to a position or motion of the controller 7 can be obtained.

It is preferable that the controller 7 includes triaxial (x, y, and z-axes) acceleration sensor 701. The triaxial acceleration sensor 701 detects linear acceleration in three directions, i.e., an up-down direction, a left-right direction, and a front-rear direction. Further, in another embodiment, a biaxial accelerometer may be used which detects the linear acceleration in the up-down direction and the left-right direction (or any other paired direction) depending on a type of a control signal to be used for a game process. For example, the triaxial or biaxial acceleration sensor 701 may be of a type available from Analog Devices, Inc. or ST Microelectronics N.V. The acceleration sensor 701 may be of an electrostatic capacitance (capacitance-coupling) type which is based on silicon micro-machined MEMS (Micro Electro Mechanical Systems) technology. Any other suitable accelerometer technology (e.g., piezoelectronic type or piezoresistance type) now existing or to be developed later may be used to provide the triaxial or biaxial acceleration sensor 701.

As one skilled in the art understands, accelerometers, as used in the acceleration sensor 701, are only capable of detecting acceleration along a straight line (linear acceleration) corresponding to each axis of the acceleration sensor. In other words, a direct output from the acceleration sensor 701 is limited to signals indicative of linear acceleration (static or dynamic) along the respective two or three axes thereof. As a result, the acceleration sensor 701 cannot detect motion, rotation, rotational motion, angular displacement, tilt, position, posture or any other physical characteristics along a non-linear (e.g., arcuate) path.

However, through processing by a computer such as a processor of a game apparatus (e.g., a CPU 10), or a processor of a controller (e.g., the microcomputer 751), in accordance with the acceleration signals outputted from the acceleration sensor 701, additional information relating to the controller 7 can be inferred or calculated (determined), as one skilled in the art will readily understand from the description herein. For example, in the case where processing is performed by a computer based on the assumption that a controller accommodating the acceleration sensor is in a static state (that is, in the case where it is only gravitational acceleration that is to be detected by the acceleration sensor), it is possible to understand whether or not, or to what extent, the controller is tilted toward the gravity direction in accordance with the detected acceleration as long as the controller is actually in a static state. Specifically, if a state where an axis to be detected by the acceleration sensor is facing vertically downward direction is set as a standard state, it is possible to find out whether or not the axis to be detected is tilted depending on whether or not 1G (gravitational acceleration) is exerted, and also possible to find out the degree of tilt of the axis to be detected depending on the magnitude of the acceleration. Further, in the case of a multi-axial acceleration sensor, it is possible to find out, in detail, the degree of tilt of respective axes with respect to the gravity direction by processing the acceleration signals along the respective axes. In this case, the processor may calculate data of a tilt angle of the controller 7 in accordance with the output from the acceleration sensor 701, or alternatively may infer an approximate tilt angle in accordance with the output from the acceleration sensor 701 without calculating data of the tilt angle. In this manner, by using the acceleration sensor 701 and the processor in a combined manner, it is possible to identify the tilt, the posture, and the position of the controller 7. On the other hand, in the case where it is assumed that the acceleration sensor is in a dynamic state, acceleration corresponding to the motion of the acceleration sensor can be detected, in addition to the gravitational acceleration element. Accordingly, if the gravitational acceleration element is removed through predetermined processing, it is possible to calculate a motion direction and the like of the controller 7. Specifically, in the case where the controller 7 including acceleration sensor 701 is dynamically accelerated and moved by a hand of a user, various motions and/or positions of the controller 7 can be calculated by processing the acceleration signal generated by the acceleration sensor 701. Even in the case where it is assumed that the acceleration sensor is in the dynamic state, it is possible to calculate a tilt with respect to the gravity direction if the acceleration corresponding to the motion of the acceleration sensor is removed through the predetermined processing. In another embodiment, the acceleration sensor 701 may include a built-in type signal processing apparatus or a dedicated processing apparatus of any other type so as to desirably process the acceleration signal to be outputted from an embedded accelerometer before outputted to the microcomputer 751. For example, in the case where the acceleration sensor is designed to detect static acceleration (e.g., gravitational acceleration), the built-in type or the dedicated processing apparatus may convert the detected acceleration signal into a tilt angle (or any other desirable parameter) corresponding thereto.

In another embodiment, as a motion sensor for detecting the motion of the controller 7, a gyro-sensor incorporating, for example, a rotating or vibrating element may be used. An exemplary MEMS gyro-sensor that may be used in the embodiment is available from Alanog Devices, Inc. Unlike the acceleration sensor 701, the gyro-sensor is capable of directly detecting rotation (or angular rate) around an axis of at least one gyroscopic element embedded therein. Thus, due to fundamental differences between a gyro-sensor and an acceleration sensor, processing performed on the output signal from these devices needs to be changed as appropriate, depending on which device is selected for a particular application.

Specifically, a significant change is performed in the case where the tilt and the posture are calculated by using the gyro-sensor instead of the acceleration sensor. That is, in the case of using the gyro-sensor, a value of the tilt is initialized at the time of starting detection. The angular rate data outputted from the gyro-sensor is then integrated. Variation in tilt from the initialized value of the tilt is calculated. In this case, the tilt to be calculated corresponds to a value of an angle. On the other hand, in the case where the tilt is calculated by the acceleration sensor, the tilt is calculated by comparing values of respective axes elements of the gravitational acceleration to predetermined standards corresponding thereto, respectively. Accordingly, the tilt to be calculated can be represented by a vector, and thus an absolute direction detected by accelerometer can be detected without performing initialization. Further, a type of the value detected as the tilt is represented by the angle in the case of using the gyro-sensor, and is represented by the vector, on the other hand, in the case of using the acceleration sensor. Therefore, in the case of using the gyro-sensor instead of the acceleration sensor, the tilt data needs to be converted in an appropriate manner, in consideration of the difference between the two devices. Since characteristics of the gyro-sensor as well as fundamental differences between the accelerometer and the gyro-sensor are well known by the one skilled in the art, further description thereof will be omitted. On the one hand, the gyro-sensor has the advantage of being capable of directly detecting rotation. On the other hand, the acceleration sensor is generally a cost-effective option as compared with the gyro-sensor when used for the controller of the present embodiment.

The communication section includes the microcomputer 751, a memory 752, a wireless module 753 and the antenna 754. The microcomputer 751 controls the wireless module 753 for wirelessly transmitting the transmission data while using the memory as a storage area in the case of processing. Further, the microcomputer 751 controls operations of the sound IC 707 and the vibrator 704 in accordance with the data received by the wireless module 753 from the game apparatus 3 via the antenna 754. The sound IC 707 processes the sound data and the like transmitted from the game apparatus 3 via the communication section 75. Further, the microcomputer 751 actuates the vibrator 704 in accordance with the vibration data (e.g., a signal for turning the vibrator 7040N or OFF) and the like which is transmitted from the game apparatus 3 via the communication section 75.

Data from the controller 7 such as an operation signal (key data) from the operation section 72, an acceleration signal (x, y, and z-axes directional acceleration data, hereinafter simply referred to as acceleration data) from the acceleration sensor 701, and the process result data from the imaging information calculation section 74 are outputted to the microcomputer 751. The microcomputer 751 temporarily stores inputted data (the key data, the acceleration data, and the process result data) in the memory 752 as the transmission data to be transmitted to a wireless controller module 19. Wireless transmission from the communication section 75 to the game apparatus 3 is performed at predetermined time intervals. Since the game process is generally performed at a cycle of 1/60 sec., the wireless transmission needs to be performed at a cycle of a shorter time period. Specifically, the game process is performed at a cycle of 16.7 ms (1/60 sec.), and a transmission interval of the communication section 75 which is composed of the Bluetooth (registered trademark) is 5 ms, for example. At a timing of performing a transmission to the wireless controller module 19, the microcomputer 751 outputs the transmission data stored in the memory 752 to the wireless module 753 as a series of pieces of operation information. Based on the Bluetooth (registered trademark) technology, for example, the wireless module 753 modulates the series of pieces of operation information by using a carrier wave having a predetermined frequency and emits the modulated radio signal from the antenna 754. Thus, the key data from the operation section 72, the acceleration data from the acceleration sensor 701, and the process result data from the imaging information calculation section 74, which are all data from the controller 7, are modulated into the radio signal by the wireless module 753, and transmitted from the controller 7. The radio signal is received by the wireless controller module 19 of the game apparatus 3, and is then demodulated or decoded by the game apparatus 3, whereby the series of pieces of operation information (the key data, the acceleration data, and the process result data) are obtained. The CPU 10 of the game apparatus 3 performs the game process in accordance with the obtained operation information and the game program. In the case where the communication section 75 is configured by using the Bluetooth (registered trademark) technology, the communication section 75 may also have a function of receiving transmission data which is wirelessly transmitted from other devices.

Figure 8:
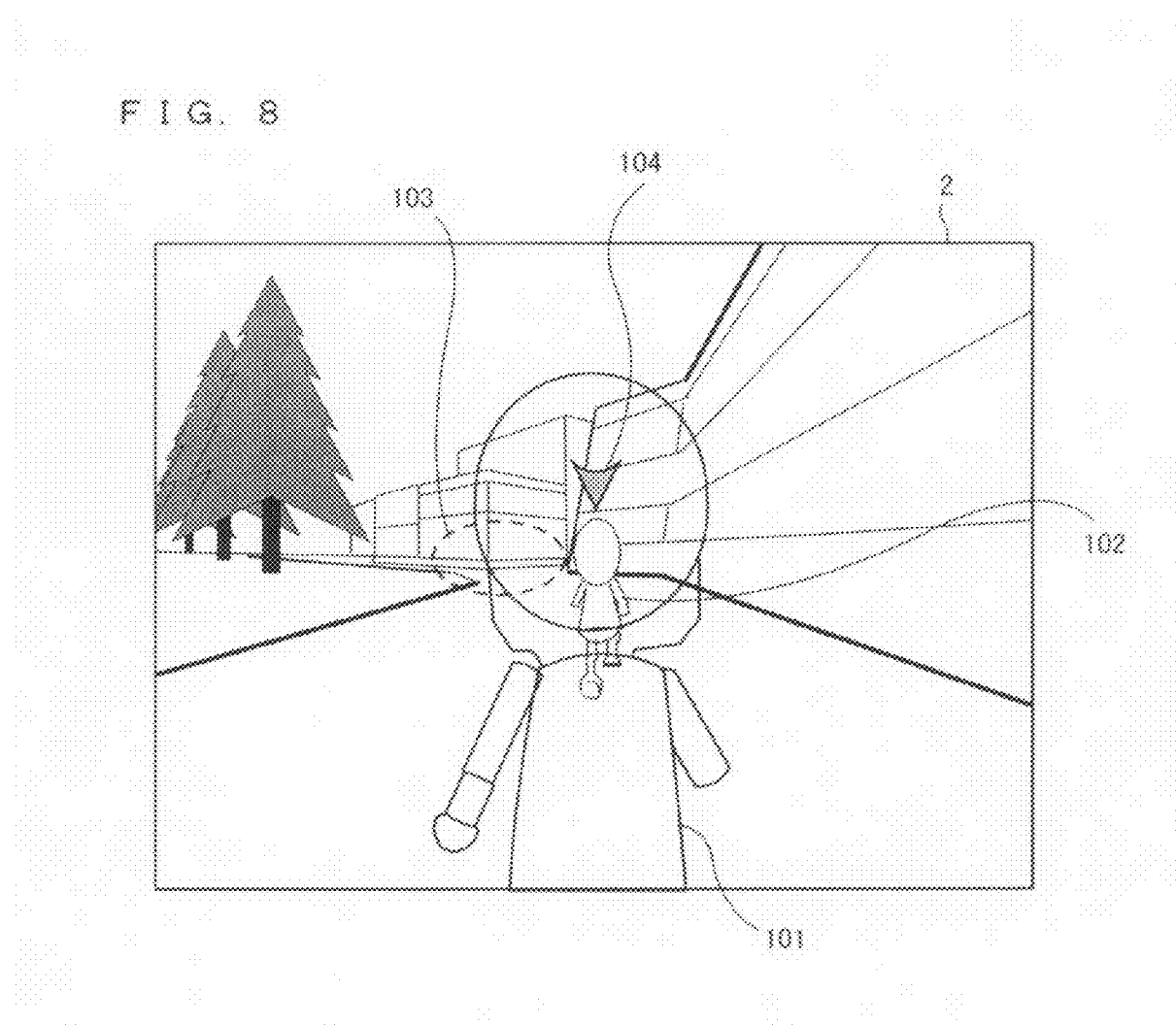
FIG. 8 is an exemplary screen of a jogging game assumed in the present embodiment.

Next, with reference to FIGS. 8 to 12, an outline of a game assumed in the present embodiment will be described. The game assumed in the present embodiment is a game based on jogging (hereinafter referred to as a jogging game). FIG. 8 is an exemplary screen of the jogging game assumed in the present embodiment. As shown in FIG. 8, a three-dimensional virtual game space is displayed on a television 2, as a game screen. On the game screen, a player character 101, and a leading character 102, who is running ahead of the player character 101, are displayed. In FIG. 8, the player character 101 is displayed in a transparent state so that a state in front of the player character 101 can be seen. In an actual game screen, the player character 101 is displayed in a semi-transparent state. Ahead of the player character 101 and the leading character 102, a branch point 103 is displayed.

In the present jogging game, a predetermined route in the above-described virtual game space is set as a jogging course. The game causes the player character 101 to jog following the leading character 102 who leads the player character 101 through the course. As shown in FIG. 8, a cursor 104 is displayed above the leading character 102. The cursor 104 is located so as to specifically indicate the leading character 102 among various characters appearing in the virtual game space.

An operation of the jogging game in the present embodiment will be described. In the jogging game, the player character 101 is operated by using an output from the above-described acceleration sensor 701 provided in the controller 7. Specifically, the player wears the controller 7 on any part of the player's body. For example, the controller 7 may be tucked in a waist belt, or may be inserted in a trousers' pocket. The player behaves as if he is jogging on the spot (jogging without moving round) (hereinafter referred to as a jogging behavior). With this behavior, the player's body oscillates. Accordingly, the controller 7 worn by the player also oscillates. The oscillation is detected by the acceleration sensor 701, and then reflected on the movement of the player character 101. That is, when the player performs the jogging behavior, a scene is displayed in which the player character 101 also performs jogging in the virtual game space and moves (runs) forward in accordance with the jogging behavior.

When the player moves the player's legs up and down quickly, that is, when the player behaves so as to run fast while performing the jogging behavior, a running speed of the player character 101 can be increased. In other words, when the player performs a fast running behavior, the number of the oscillations of the controller 7 per unit time (oscillation frequency) increases. A change in the number of the oscillations is reflected on the game process, whereby it is possible to enable the player character 101 to run fast.

In this manner, in the present jogging game, the player performs the jogging behavior while wearing the controller 7 on the player's body, whereby it is possible to cause the player character 101 to run forward. Further, when the player adjusts the speed of the up-and-down motion of the player's legs, the running speed of the player character 101 can be adjusted.

While the game is played in this manner, the game may become boring if a single jogging course is used every time for the jogging game. Therefore, in the present jogging game, a plurality of jogging courses is available. Branch points are located along each of the jogging courses, and thus the course branches off in mid-course. Accordingly, a running course can be changed in mid-course of jogging.

As an operation method for changing the jogging course, a method may be considered in which the player removes the controller 7 which is being worn by the player when the character player 101 approaches the branch point, and holds the controller 7 with the player's hand so as to select a desirable course by a button operation or the like. However, it is very bothersome for the player to hold and operate the controller 7 with the player's hand during the above-described jogging behavior in order to perform a course change. In addition, if the player holds and operates the controller 7 with the player's hand for the course change while the player character 101 is being caused to run based on the oscillation of the controller 7, the running speed of the player character 101 may be decreased, and in some cases, the player character 101 may stop running. Further, the player is actually performing the jogging behavior, thereby feeling a sense of assimilation with the content of the game and reality of the content of the game. Accordingly, if such a hand operation is performed, the assimilation with and the reality of the content of the game are disturbed and amusingness of the game is destroyed instantly. Therefore, the present embodiment enables the player to continue the jogging behavior and to perform the course change without applying the hand operation so as not to cause the player to feel a sense of incongruity. Accordingly, variety is given to a development of the game so as to prevent the game from becoming monotonous, whereas the assimilation with the content of the game as the reality of the content of the game are kept unharmed.

Figure 9:
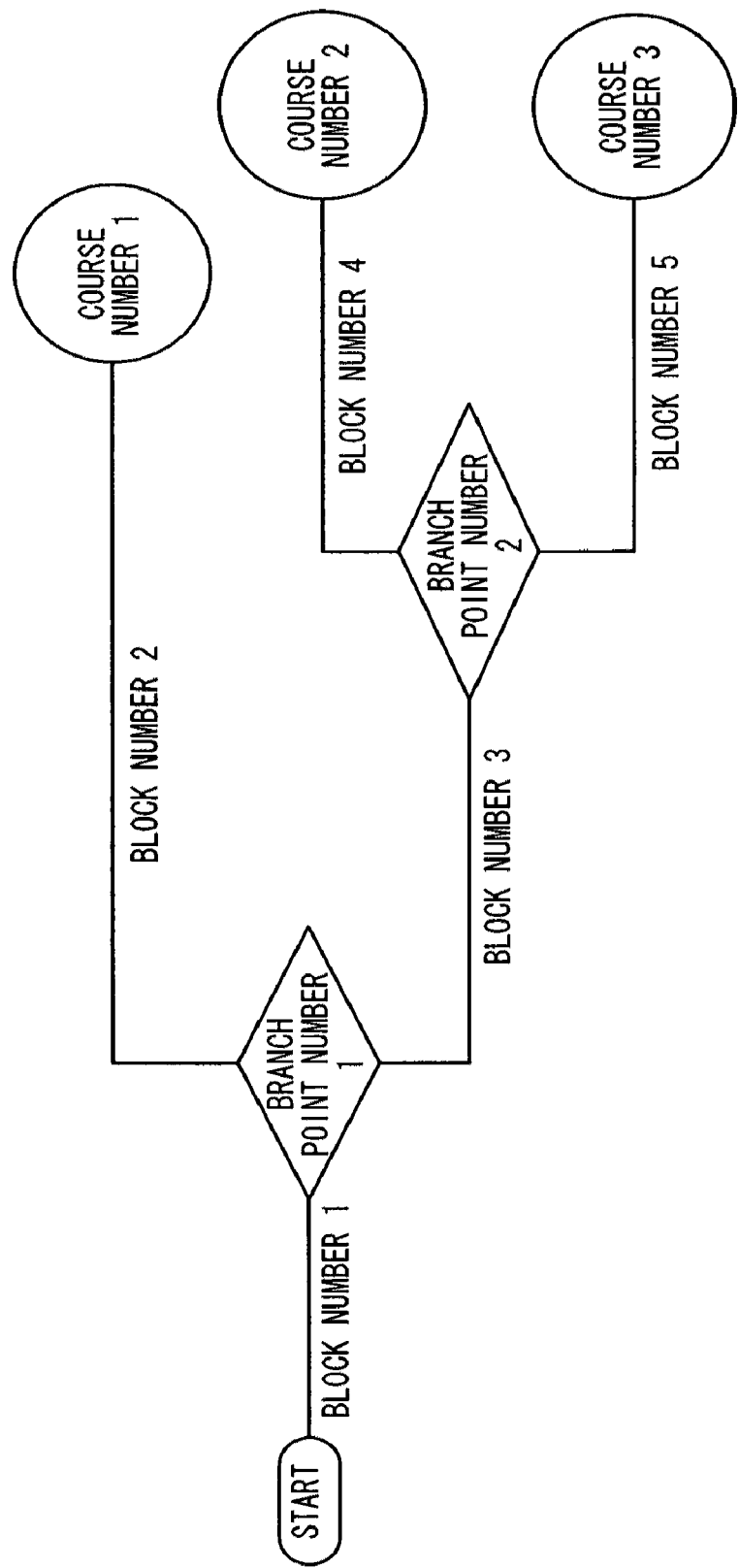
FIG. 9 is a diagram illustrating a configuration of a course of the present jogging game.

Processing of the above-described course change will be described. First, a configuration of the jogging course of the present jogging game will be described. FIG. 9 is a diagram showing a configuration of a course of the jogging game. There are three courses available in the jogging game. In FIG. 9, three courses, i.e., a first course, a second course, and a third course are shown. Each of the courses is constituted of a plurality of blocks. For example, the first course (hereinafter simply referred to as course 1) is constituted of a combination of a first block (hereinafter simply referred to as block 1) and a second block (hereinafter simply referred to as block 2, and other blocks being referred in a similar manner). Further the second course (hereinafter simply referred to as course 2) is constituted of a combination of three blocks, i.e., block 1, block 3, and block 4. Still further, the third course (hereinafter simply referred to as course 3) is constituted of a combination of three blocks, i.e., block 1, block 3, and block 5.

At the end of each of the blocks except for a finish point, the branch point is set. A branch point number is assigned to each of the branch points. In an example shown in FIG. 9, the branch point having the branch point number "1" assigned thereto is located at the end of block 1. At the branch point, either of block 2 (i.e., a route proceeding to the course number 1) or block 3 (a route proceeding to the course number 2 or the course number 3) can be chosen.

As an exemplary course configuration as above described, an outline of a process of the course change in the present embodiment will be described with reference to above-described FIGS. 8 to 12. At the time of starting the jogging game, the course number 1 is set as an initial value of the jogging course along which the player character 101 runs. The jogging game starts, while the leading character for leading the player character 101 through the course number 1 is displayed. That is, unless the course change is performed, the player character 101 runs along the course number 1 and crosses the finish line. Hereinafter, a course along which the player character 101 runs is referred to as a main course. The branch point 103 shown in FIG. 8 corresponds to the branch point having the branch point number "1" shown in FIG. 9. It is assumed that when turning the branch point 103 to the right, the course proceeds to block 2, and when turning to the left, the course proceeds to block 3.

Figure 10:
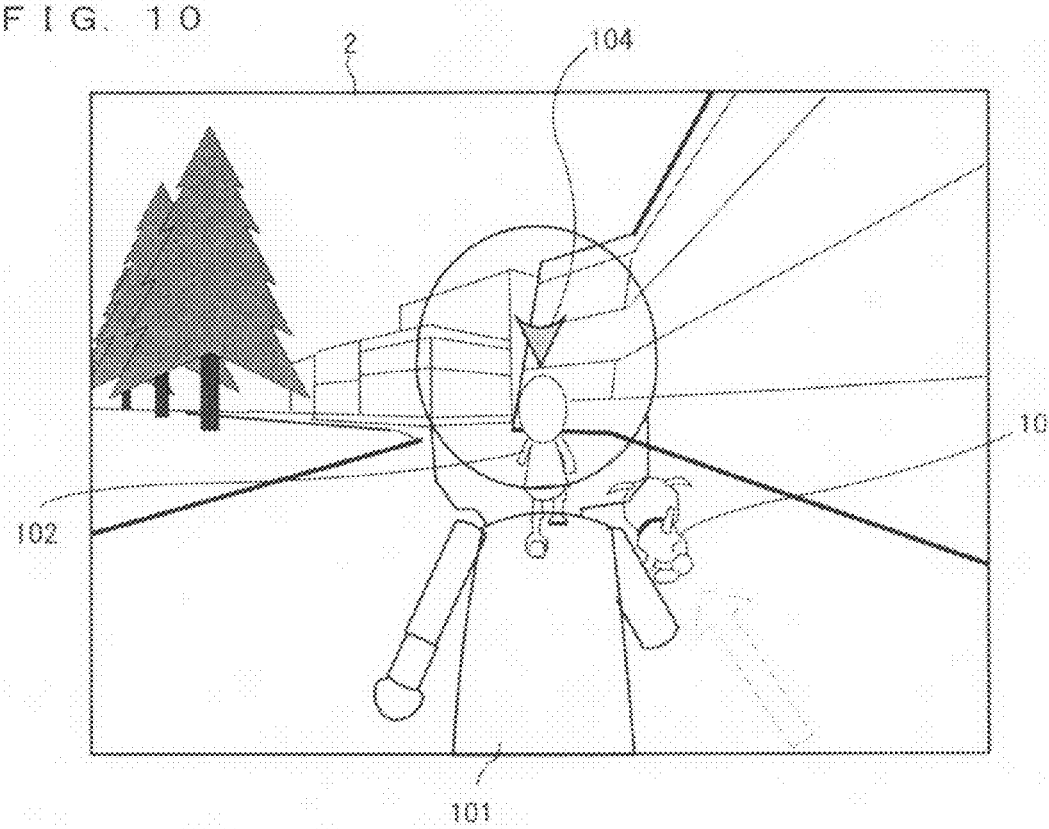
FIG. 10 is an exemplary screen of the jogging game assumed in the present embodiment.

After the game has started, when the player performs the above-described jogging behavior so as to cause the player character to follow the leading character 102 and to keep running forward, the player character approaches the branch point 103 having the branch point number "1" as shown in FIG. 8. When the player character approaches the branch point 103, as shown in FIG. 10, non-player character of a dog shape (hereinafter referred to as a branching character 105) appears behind the player character 101 and overtakes the player character 101. The branching character 105 is a character for allowing the player character 101 to perform the course change. The running speed of the branching character 105 is faster than that of the leading character 102. The branching character 105 is interrelated with the course number 2. Hereinafter, a course interrelated with the branching character 105 (the course number 2 in this case) is referred to as a sub-course. When the player character 101 runs and follows the branching character 105 when the branching character 105 appears, the jogging course can be changed.

Figure 11:
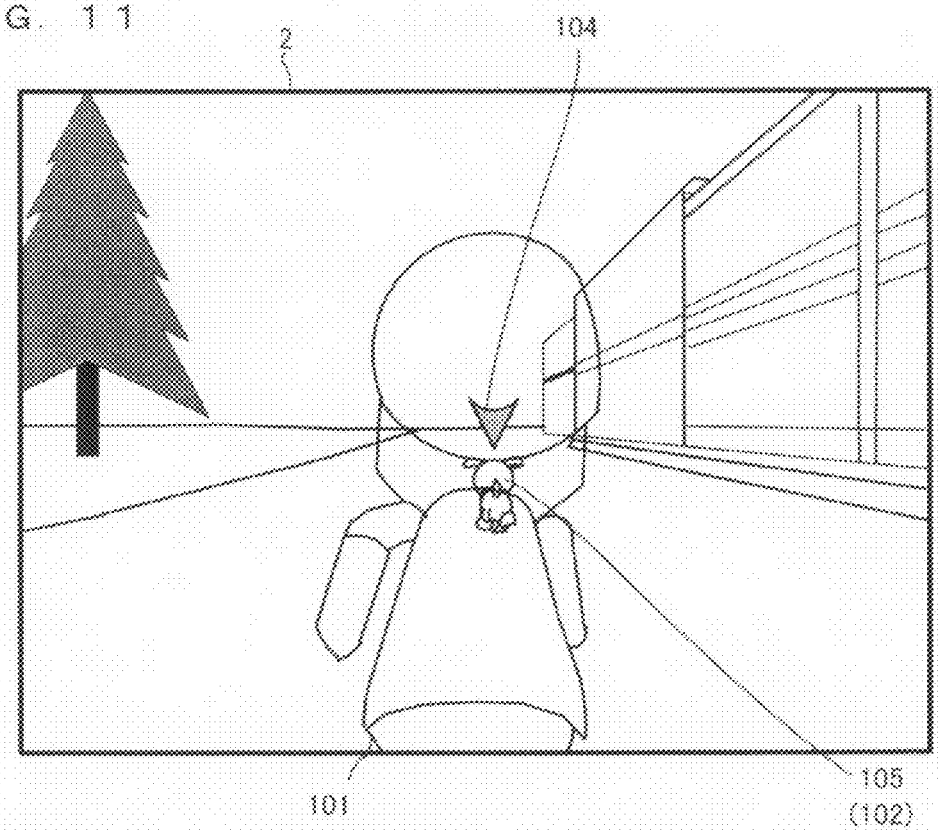
FIG. 11 is another exemplary screen of the jogging game assumed in the present embodiment.

Specifically, while the branching character 105 is appearing on the screen, the player causes the player character 101 to increase the running speed so as to overtake the leading character 102 and follow the branching character 105. Accordingly, the player character 101 turns the branch point 103 to the left, and proceeds to block 3. That is, the jogging course changes from the course number 1, which is set as an initial value, to the course number 2, which is interrelated with the branching character 105. In other words, a course proceeding to the course number 2, which is set as the sub-course, is now set as a main course along which the player runs. FIG. 11 shows a state in which the player character 101 turns the branch point 103 to the left and proceeds to block 3. As shown in FIG. 11, when the jogging course has been changed, the cursor 104 is displayed above the branching character 105. Thereafter, the branching character 105 of the dog shape is turned to the leading character, and leads the player (at this moment, the running speed of the dog shape character is decreased slightly such that the player can run at a comfortable running pace).

Figure 12:
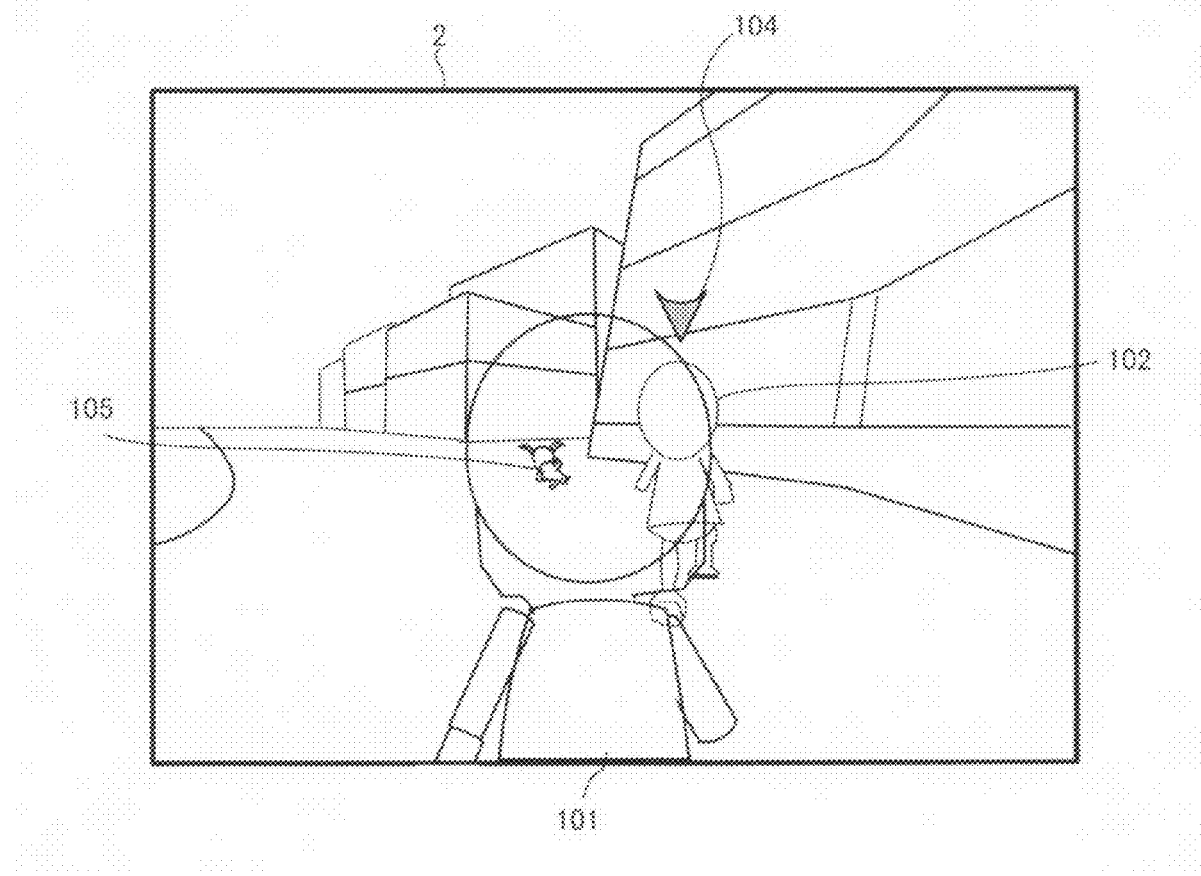
FIG. 12 is another exemplary screen of the jogging game assumed in the present embodiment.

On the other hand, in the state shown in FIG. 10, if the player character 101 does not increase the running speed and keeps following the leading character 102, the branching character 105 runs off ahead as shown in FIG. 12. As a result, the player character 101 keeps running the current course (the course number 1 set as the initial value). That is, the player character 101 follows the leading character 102, turns the branch point 103 to the right, and proceeds to block 2.

In this manner, in the present embodiment, the branch points are assigned on the jogging course, and the branching character 105 is caused to appear at each of the branch points. When the character player 101 runs and follows the branching character 105, the jogging course can be changed. Accordingly, the course change can be performed in a natural manner without interrupting the jogging behavior, and thus the player can enjoy various jogging courses. As a result, it is possible to prevent the development of the game from becoming monotonous, and also possible to enhance the amusingness of the game.

Figure 13:
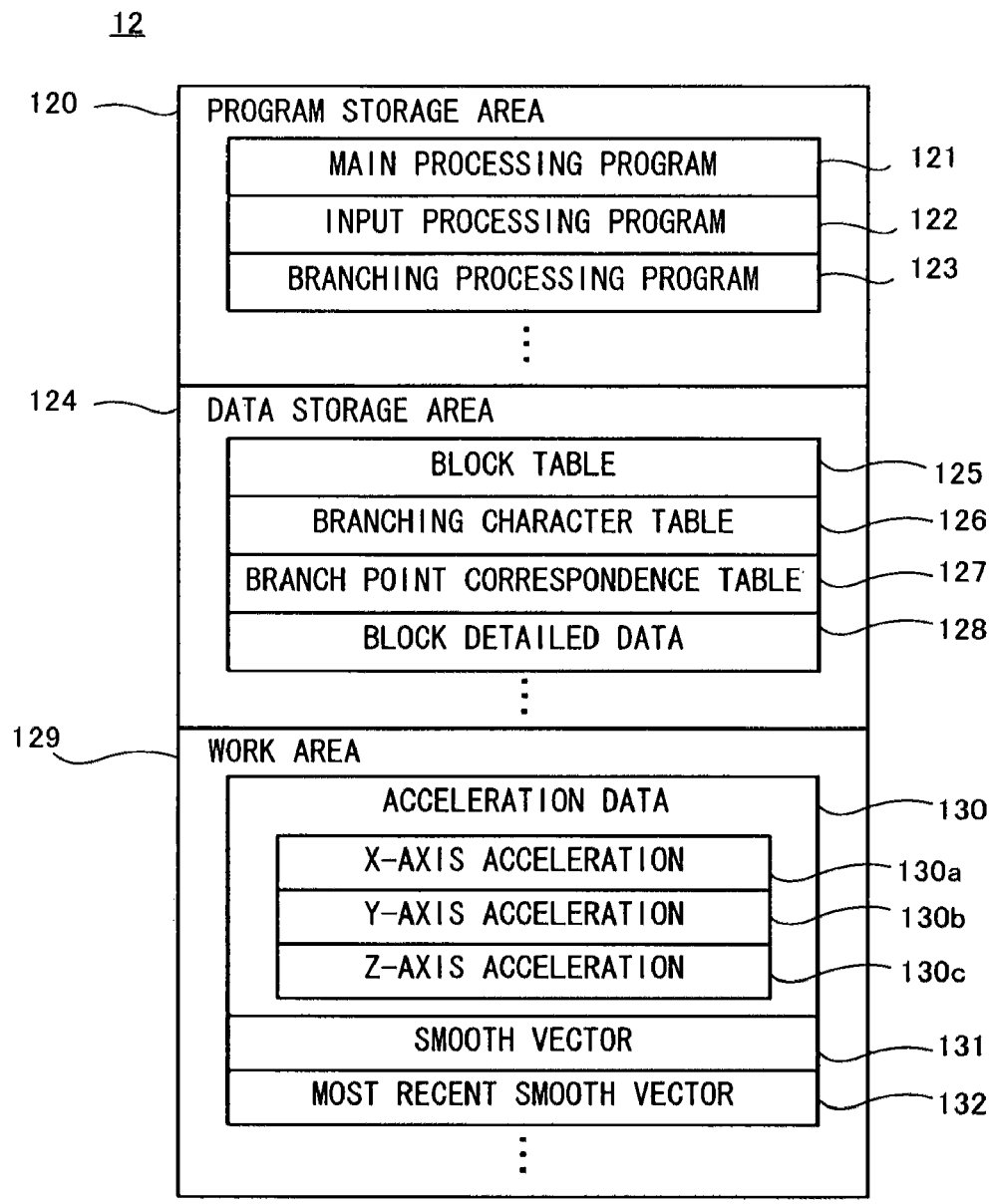
FIG. 13 is a diagram showing a memory map of an external main memory 12.

Next, various data used in the present embodiment will be described. FIG. 13 is a diagram showing a memory map of the external main memory 12 shown in FIG. 2 (the internal main memory 11e may be replaced with the external main memory 12, or alternatively the both of the memories may be used). As shown in FIG. 13, the external main memory 12 includes a program storage area 120, a data storage area 124, and a work area 129. Data stored in the program storage area 120 and the data storage area 124 are those data which are previously stored in the disc 4 and copied to the external main memory 12 for the sake of the jogging game process. For the sake of convenience of description, respective data is described in a table data format. However, the data is not necessarily stored in the table data format, but may be in any format as long as data equivalent to contents of the table is stored. In the external main memory 12, not only data included in information shown in FIG. 13, but also data required for the game process such as data relating to the virtual game space (geography data and the like) and audio data are stored.

The game program storage area 120 stores the game program executed by the CPU 10, and the game program is composed of a main processing program 121, an input processing program 122, a branching processing program 123 and the like. The main processing program 121 is a program corresponding to processing illustrated in a flowchart shown in FIG. 17 which is described later. The input processing program 122 is a program for causing the CPU 10 to execute processing for causing the player character 101 to run in accordance with the output from the acceleration sensor 701. The branching processing program 123 is a program for causing the CPU 10 to execute processing relating to the above-described course change.

The data storage area 124 stores therein data such as a block table 125, a branching character table 126, a branch point correspondence table 127, and block detailed data 128.

The block table 125 is a table showing an order of the respective blocks assigned in the respective courses. FIG. 14 is a diagram showing an exemplary data configuration of the block table 125. The block table 125 shown in FIG. 14 includes a course number 1251, an alignment sequence 1252 which shows an order of the course numbers and is composed of consecutive numbers starting from 1, and a block number 1253 which is identified based on the course number 1251 and the alignment sequence 1252. The table shown in FIG. 14 exemplifies a configuration of the course described with reference to FIG. 9. In FIG. 14, the block number 1253 of the first block in course 1 is defined as "1". The block number 1253 of the second block in course 1 is defined as "2". The block numbers 1253 of the third and the fourth blocks in course 1 are each defined as "−1", which indicates that such blocks do not exist. That is, it is indicated that course 1 has only two blocks.

With reference back to FIG. 13, the branching character table 126 is a table indicative of a correspondence relation between the branching character and the course number. FIG. 15 is a diagram showing an exemplary data configuration of the branching character table 126. The branching character table 126 shown in FIG. 15 includes a branching character number 1261, a course number 1262, and object data 1263. According to the example shown in FIG. 15, a branching character having the branching character number 1261 "1" corresponds to a course having the course number "1". A branching character having the branching character number 1261 "2" corresponds to a course having the course number "2". Further, the object data 1263 includes other various data relating to the branching character. For example, the object data 1263 includes modeling data, texture data, and data relating to an initial allocation in the virtual game space, a running speed and the like. Based on the data, a polygon model is generated and allocated in the virtual game space.

With reference back to FIG. 13, the branch point correspondence table 127 is a table indicative of a correspondence relation between the branch point number on the course above described with reference to FIG. 9 and the branching character. In other words, the branch point correspondence table 127 is a table which specifies the branching character caused to appear at each of the branch point numbers. FIG. 16 is a diagram showing an exemplary data configuration of the branch point correspondence table 127. The branch point correspondence table 127 shown in FIG. 16 includes a branch point number 1271 and a branching character number 1272. In the example shown in FIG. 16, the branching character having the branching character number "1" corresponds to the branch point number "1". In other words, at the branch point having the branch point number "1", the branching character having the branching character number "1" is to appear.

With reference back to FIG. 13, the block detailed data 128 includes detailed data relating to the above-described each of the blocks. For example, data relating a position and a range of each of the blocks in the virtual game space, and data relating an event happening during running in each of the blocks are interrelated with the above-described block number 1253 and stored.

In the work area 129, acceleration data 130, a smooth vector 131, a most recent smooth vector 132 are stored. In addition to these, various flags, variable data and the like which are used in the jogging game process are stored.

The acceleration data 130 is included in a series of pieces of operation information transmitted from the controller 7 as the transmission data. The acceleration data 130 stores a predetermined number of frames of obtained acceleration data (e.g., 30 frames, 1 frame (1/60 sec.) representing an interval of the game process). The acceleration data 130 includes an X-axis acceleration 130a, a Y-axis acceleration 130b, and Z-axis acceleration 130c which are detected, by the acceleration sensor 701, from three axial components of the X-axis, the Y-axis, and the Z-axis, respectively. The wireless controller module 19 provided to the game apparatus 3 receives the acceleration data 130 included in the operation data transmitted from the controller 7 at predetermined intervals, e.g., at every 5 ms intervals, and stores the same in a buffer, which is not shown and is also accommodated in the wireless controller module 19. The acceleration data 130 is, thereafter, read on a frame-by-frame basis, which is an interval of the game process, and then stored in the external main memory 12.

The smooth vector 131 and the most recent smooth vector 132 are calculated based on the acceleration data from the controller 7. The data is used for showing the gravity direction with respect to the posture of the controller 7 at a certain time point. As above described, the interval of the game process in the present embodiment is 1 frame. The smooth vector 131 is data calculated through processing in the current frame, and the most recent smooth vector 132 is vector data of the smooth vector which is calculated through processing in the frame immediately prior to the current frame and then stored.

Figure 17:
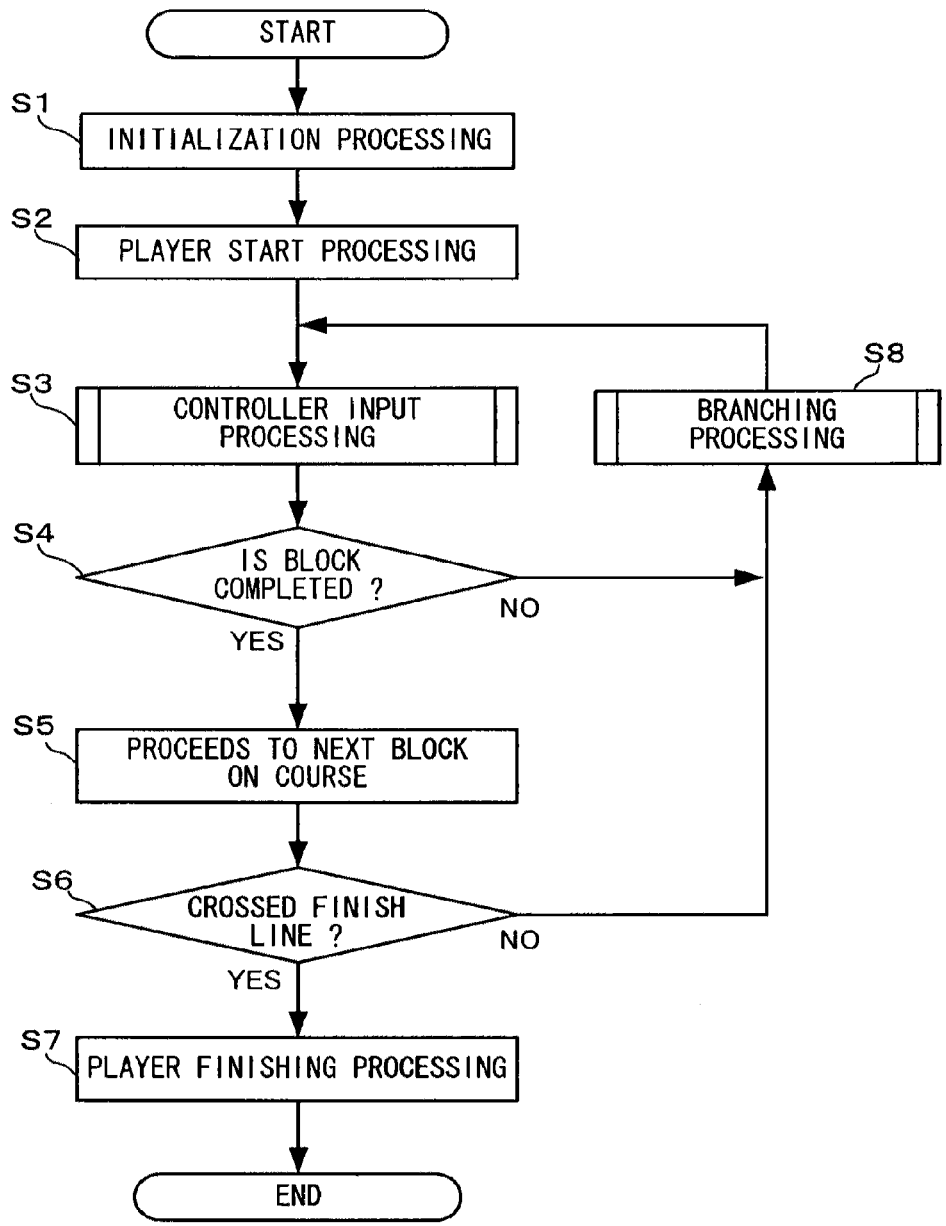
FIG. 17 is a flowchart showing a jogging game process according to certain example embodiments.
Figure 18:
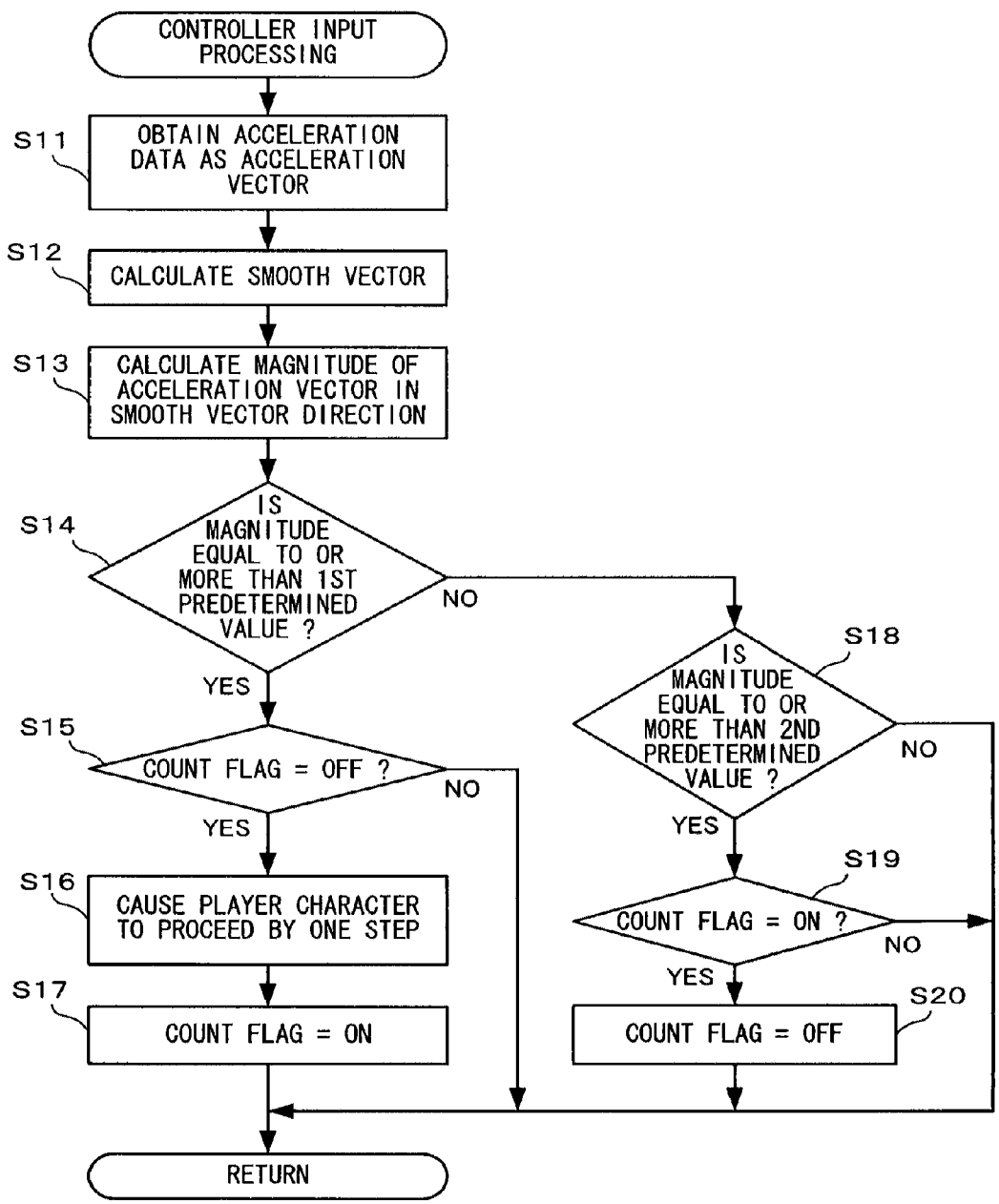
FIG. 18 is a flowchart showing, in detail, controller input processing illustrated in step S3 shown in FIG. 17.
Figure 19:
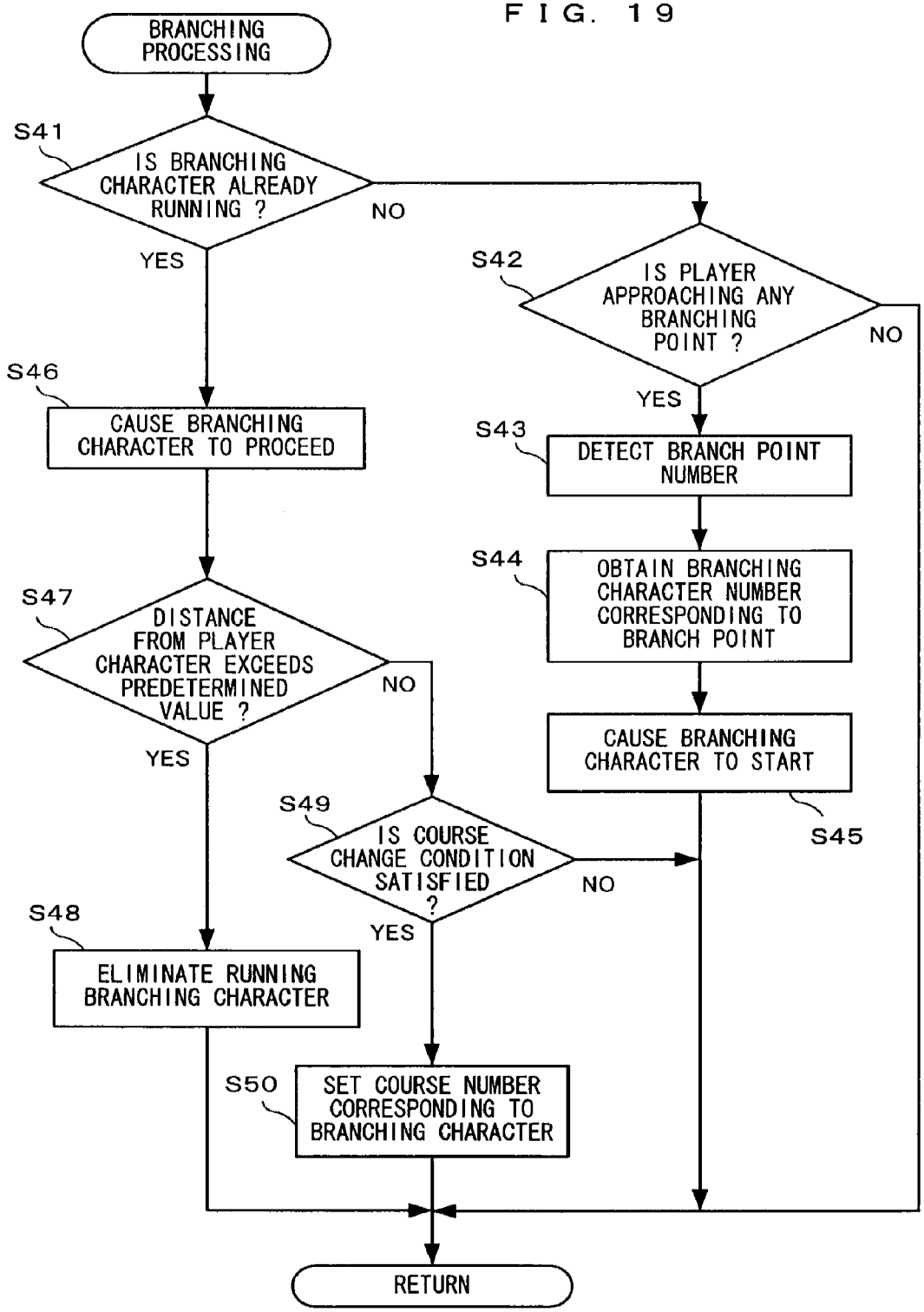
FIG. 19 is a flowchart showing, in detail, branching processing illustrated in step S8 shown in FIG. 17.

With reference to FIGS. 17 to 19, the jogging game processing executed by the game apparatus 3 will be described in detail. FIG. 17 is a flowchart showing entire processing of the jogging game process executed by the game apparatus 3. FIG. 18 is a sub-routine showing, in detail, operations of the controller input processing shown in FIG. 17. FIG. 19 is a sub-routine showing, in detail, operations of the branching processing shown in FIG. 17.

First, in step S1 shown in FIG. 17, processing for initializing various data used for subsequent processing is executed. Specifically, the CPU 10 sets "1" to a variable Cb indicative of the course number of the jogging course along which the player character 101 runs. That is, as an initial setting, the player character 101 is set to run course 1 (the above-described main course is set). Further, the CPU 10 sets "1" to a variable Knb indicative of the number of the block in the jogging course, in which the player character 101 is running. The CPU 10 then accesses the block table 125, and based on the variable Cb (relating to the course number 1251) and the variable Knb (relating to the alignment sequence 1252), searches and obtains the block number 1253. In an example shown in FIG. 14, "1" is obtained. The CPU 10 sets the obtained value to the variable Kb indicative of the block number. Further, the CPU 10 sets a count flag to "ON", the count flag being used in the input processing described later. "0" is set to the smooth vector 131, and the most recent smooth vector 132. The player character 101, and the leading character 102 leading the player character 101 along course 1 are then placed at the starting point of the jogging course in the virtual game space. Other necessary objects are also placed in the virtual game space as appropriate. A game image representing a game space structured as above described is generated, and the generated game image is displayed on the monitor 2.

In step S2, processing for causing the player character 101 to start is executed. That is, the CPU 10 displays, on the screen, a message indicative of starting of running (such as a countdown message). In addition to this, the CPU 10 causes the leading character 102 to start running. Thereafter, a processing loop from steps S3 to S6 and step S8 are repeated in each frame, whereby the game progresses.

In step S3, the controller input processing is performed. In the processing, based on the input from the acceleration sensor 701, player character 101 is caused to move by one step.

FIG. 18 is a flowchart showing, in detail, the controller input processing illustrated in step S3. As shown in FIG. 18, first, processing is performed so as to calculate the gravity direction with respect to the current posture of the controller 7. In step S11, the CPU 10 reads the acceleration data 130 transmitted from the controller 7 as the acceleration vector. In subsequent step S12, the smooth vector 131 is calculated. The smooth vector is calculated by eliminating a motion (noise) performed by the player, except for the gravity acceleration, from the gravity constantly applied to the controller 7. The direction indicated by the smooth vector, from which the noise has been eliminated, represents the gravity direction with respect the posture of the controller 7 at that time.

The above-described smooth vector is calculated by using the acceleration vector obtained in above-described step S11 and the most recent smooth vector 132. Specifically, the smooth vector (bx, by, bz) is calculated based on the following equations.

$$bx=bx'+(ax-bx')\times k1$$

$$by=by'+(ay-by')\times k1$$

$$bz=bz'+(az-bz')\times k1$$

In the above equations, a variable ax is a value representing an x component of the acceleration vector, a variable ay is a value representing a y component of the acceleration vector, and a variable az is a value representing a z component of the acceleration vector. Further, a variable bx' is a value representing an x component of the most recent smooth vector 132, a variable by' is a value representing a y component of the most recent smooth vector 132, and a variable bz' is a value representing a z component of the most recent smooth vector 132. A value of a constant k1 is previously fixed.

In step S13, based on the acceleration vector read in above-described step S11, a magnitude of the acceleration vector (hereinafter gravity direction vector) in the direction of the smooth vector (i.e., the gravity direction vector) is calculated. Based on this calculation, the amount of oscillation of the controller 7, which is caused by the player, with respect to the gravity direction can be understood. Further, in this step, the smooth vector 131 calculated in step S12 is stored as the most recent smooth vector 132. The above-described processing method is merely an example, and not only this method, but also any other processing method may be applicable as long as the magnitude of the acceleration in the gravity direction can be calculated.

In step S14, whether or not the magnitude of the gravity direction vector calculated in above-described step S13 is equal to or greater than a first predetermined value is determined. As a result, when the magnitude is equal to or greater than the first predetermined value, whether or not the count flag is "OFF" is determined in subsequent step S15. When the count flag is "ON" (NO in step S15), the controller input processing ends as it is.

On the other hand, when the count flag is "OFF" (YES in step S15) as a result of the determination in step S15, processing is performed in step S16 so as to cause the player character 101 to move forward by a distance of one step. In the present embodiment, a fixed value is previously set as the distance of one step (that is, a length of a stride). Further in step S17, the count flag is set to "ON", and the controller input processing ends.

On the other hand, when the magnitude of the gravity direction vector is not equal to or greater than the first predetermined value as a result of the determination in above-described step S14 (NO in step S14), whether or not the magnitude of the gravity direction vector is equal to or greater than a second predetermined value is determined in subsequent step S18. The first predetermined value and the second predetermined value are in a relation of "the first predetermined value≧the second predetermined value". As a result, when the gravity direction vector is not equal to or greater than the second predetermined value (NO in step S18), the controller input processing ends.

On the other hand, when the magnitude of the gravity direction vector is equal to or less than the second predetermined value as a result of the determination in above-described step S18 (YES in step S18), whether or not the count flag is set to "ON" is determined in subsequent step S19. As a result, when the count flag is "OFF" (NO in step S19), the controller input processing ends. On the other hand, when the count flag is "ON" (YES in step S19), the count flag is set to "ON" in step S20. The controller input processing ends thereafter. Here ends the description of the controller input processing.

With reference back to FIG. 17, when the controller input processing ends, in subsequent step S4, whether or not the player character 101 has finished running in the block in which the player character is currently running is determined. As a result, when the player character 101 has not yet to finish running (NO in step S4), the branching processing (details are described later) is performed in step S8, and then the processing is repeated after returning to step S3. On the other hand, when the player character 101 has finished running in the current block (YES in step S4), processing is performed so as to cause the player character 101 to proceed to the next block in the current jogging course. Specifically, the CPU 10 adds 1 to the variable Knb. Further, the CPU 10 accesses the block table 125, and obtains the block number 1253 indicative of the block in which the player character is to run next in accordance with the variable Cb and the variable Knb, that is, in accordance with the current course number and the order (alignment sequence) of the blocks. The CPU 10 sets the obtained block number 1253 to the variable Kb. Further, based on the block number 1253, the CPU 10 obtains, from the block detailed data 128, detailed data of the block in which the player character is to run next, and performs processing so as to reflect the obtained detailed data on the virtual game space as appropriate.

Next, in step S6, whether or not the player character 101 has finished running through the whole of the jogging course, that is, whether or not the player character 101 has crossed the finish line is determined. When the player character 101 has crossed the finish line (YES in step S6) as a result of the determination, player finish processing is performed in subsequent step S7. Specifically, a message indicating that the player character 101 has crossed the line, or time taken from the player's starting to crossing the finish line is displayed. The jogging game process in the present embodiment then ends.

On the other hand, when the player character 101 has yet to cross the finish line (NO in step S6) as a result of the determination in step S6, the branching processing is performed in step S8. In the processing, processing relating to a change in the jogging course such as appearance of the branching character as above described is performed.

FIG. 19 is a flowchart showing, in detail, the branching processing illustrated in above-described step S8. As shown in FIG. 19, in step S41, whether or not any branching characters 105 is already running within a predetermined area from a current position of the player character 101 in the virtual game space is determined. As a result, when the branching character 105 is not running (NO in step S41), whether or not the player character 101 is approaching any one of the branch points is determined in step S42. When the player character 101 is approaching any one of the branch points (YES in step S42), the branch point number of the branch point which the player character 101 is approaching is detected in step S43. The branch point number is detected, for example, based on the current position of the player character 101, a position of the branch point, and the like in the virtual game space.

In step S44, from the branch point correspondence table 127, the branching character number 1272 corresponding to the detected branch point number of the branch point is obtained.

In step S45, the object data 1263 corresponding to the obtained branching character number 1272 is read. Based on the object data 1263, the branching character 105 is generated (the branching character 105 is interrelated with a predetermined course (the sub-course) by using the branching character number 1272 as a key). Further, based on data indicative of a position of the branching character 105 (not shown), the data being included in the object data 1263, the generated branching character 105 is placed in the virtual game space. In the present embodiment, the branching character 105 is placed behind the player character 101. Preferably, the branching character 105 is placed at a relatively close distance from the player character 101. This is because the branching character 105 needs to be caused to overtake the player character 101 at such a speed that does not cause the player to feel unnatural. That is, when the branching character 105 is placed too far from the player character 101, the branching character 105 is caused to move much faster so as to overtake the player character 101, and consequently the branching character 105 overtakes the player character 101 at a speed which the player character cannot catch up with. The situation like this needs to be prevented. After the branching character 105 is caused to start running, the branching processing ends.

On the other hand, as a result of the determination in above-described step S41, when it is determined that the branching character 105 is already running (YES in step S41), the branching character is then caused to move forward, in subsequent step S46, in accordance with a running speed set to the branching character. In the present embodiment, the running speed of the branching character 105 is set faster than that of the leading character 102. Therefore, subsequent to several to several tens of frames after the player character starts running, the branching character 105 appears on the screen so as to overtake the player character 101, and also overtakes and runs ahead of the leading character 102.

In step S47, whether or not a distance between the player character 101 and the branching character 105 exceeds a predetermined value is determined. That is, determined is whether or not the branching character 105 has run forward off the screen since the player character 101 does not chase the branching character 105 (that is, without increasing the running speed). As a result, when it is determined that the distance exceeds the predetermined value (YES in step S47), processing is performed so as to eliminate the branching character 105, which is being running, from the virtual game space.

On the other hand, when it is determined that the distance does not exceed the predetermined value (NO in step S47) as a result of the determination in step S47, whether or not a course change condition is satisfied is determined in step S49. The course change condition in the present embodiment is determined based on whether or not a situation, in which the branching character 105 exists in an area within a certain distance from the player character 101, is maintained for a predetermined time period or more. That is, whether or not a situation, in which the player character 101 runs at an increased speed, overtakes the leading character, and chases or accompanies the branching character 105, is maintained for the predetermined time period is determined. Specifically, for example, whether or not a distance between the player character 101 and the branching character 105 is equal to or less than a predetermined value is determined. When the distance is equal to or less than the predetermined value, counting of the number of frames or the like is started from that time point so as to count a time period in which the distance between the player character 101 and the branching character 105 remains equal to or less than a predetermined value. When the number of counts of the frames or the like reaches a predetermined value or more, it is determined that the above-described course change condition has been satisfied. When the course change condition has been satisfied as a result of the above-described determination (YES in step S49), the jogging course is changed to a course which is guided by the branching character 105. That is, the above-described sub-course is set as the main course. Specifically, the CPU 10 accesses the branching character table 126, and obtains the course number 1262 corresponding to the branching character 105. The CPU 10 sets the obtained course number 1262 to the variable Cb. In this case, the CPU 10 performs a setting such that the cursor 104 is displayed above the branching character 105 in order to indicate that the jogging course has been changed and the leading character has been also changed. Further, the CPU 10 causes the branching character 105 to reduce the running speed to a predetermined speed level such that the player can easily keep the player's running pace. The branching processing ends, thereafter.

On the other hand, as a result of the determination in step S49, when it is determined that the course change condition is not satisfied (NO in step S49), the branching processing ends as it is. Here ends the description of the jogging game process in the present embodiment.

In this manner, in the present embodiment, it is possible to adjust the running speed of the player character 101 without causing the player to hold and operate the controller 7 with the player's hand. Accordingly, in the game such as the jogging game, the player can obtain the assimilation with the game content and reality of the game content, whereby the amusingness of the game can be increased.

Further, in the present embodiment, a plurality of jogging courses is prepared, and the above-described branching characters 105 appear while the player character 101 is running, whereby the course change can be performed while the player keeps performing the jogging behavior without operating the controller by hand. Accordingly, the player can run along various jogging courses, and it is possible to prevent the game development from becoming monotonous.

In the controller input processing in the above-described embodiment, a fixed value is used to indicate the distance of one step, that is, the length of the stride moved by the player character 101. In addition to this, the length of the stride may be changed in accordance with a magnitude of a frequency or an amplitude of the oscillation of the controller 7 obtained from the acceleration sensor. For example, the length of the stride of the player character 101 is increased in accordance with an increase in the frequency per unit time. Further, the magnitude of the amplitude for one step is detected, and the length of the stride may be further increased in accordance with an increase in the magnitude of the amplitude. It is considered that the magnitude of the amplitude is calculated as a difference between a magnitude of the acceleration when the acceleration exceeds the first predetermined value in above-described step S14, and a magnitude of the acceleration when the acceleration becomes equal to or less than the second predetermined value in above-described step S18. Accordingly, when the player performs the jogging behavior much strenuously and speedily, it is possible to cause the player character to move further forward compared to the case where the length of the stride is fixed. Thus, exhilaration of the player can be enhanced. For example, suppose that the length of the stride of the player character is fixed to a value of 1 m in the virtual game space. When the player character takes 10 steps forward in 5 seconds, then the player character moves forward by 10 m. When the player character takes 20 steps forward in 5 seconds, then the player character moves forward by 20 m, which is doubled, in proportion to the number of steps. Further, as above described, if the length of the stride is set to increase in accordance with the frequency (the number of steps) and the amplitude, the player character is caused to move forward by 10 m when the player takes 10 steps forward in 5 seconds, whereas the player character may be caused to move forward by 30 m when the player takes 20 steps forward in 5 seconds, for example.

Regarding the branching character, only one branching character appears in the above-described embodiment. In addition to this, one course may branch off into three or more courses at the branch point such that a plurality of branching characters are caused to appear, the branching characters being interrelated with the respective courses to branch off. The visual appearance of these branching characters may vary depending on the characters. In this case, it is preferable that the running speeds of the branching characters which appear concurrently are different from one another. If the running speeds are equal to one another, there may be a case where it is difficult to determine which of the branching characters the player character accompanies. If the running speeds are different from each other but the difference is small, there may be a case where the player character is running so as to accompany two branching characters. In this case, the course change may be performed such that a course which is interrelated with the branching character which is the closer to the player character 101 is selected.

In above-described embodiment, the branching character 105 is caused to appear so as to overtake the player character 101 from therebehind. However, in addition to this, the branching character 105 may be caused to appear ahead of the player character 101. In this case, the running speed of the branching character 105 is set slower than that of the leading character 102. That is, the branching character 105 is caused to appear so as to run slowly ahead of the player character. As a result, the player character 101 gradually catch up with the branching character 105 which has appeared ahead of the player character 101. When the player character 101 approaches the branching character 105 to some degree and the player reduces the running speed, then the player character 101 is caused to run so as to accompany the branching character 105. Based on the accompanying state which continues for a predetermined time period, whether or not the course change condition is satisfied may be determined.

In addition to the condition as above described, as an exemplary course change condition in step S49, whether or not a rapid speed change has occurred within a unit time may be determined. For example, when the player character approaches the branch point, and the branching character appears, if the player tries to accompany the branching character 105, the running speed will rapidly increase. Therefore, if such a rapid speed increase is detected within a predetermined time period after appearance of the branching character 105, the player character is determined to accompany the branching character, and accordingly it may be determined that the course change condition is satisfied.

Further, the leading character 102 is not necessarily caused to appear during the game. In addition, the branching character 105 may be also caused to appear only during the course change processing before the branch point. That is, when the player character 101 approaches the branch point, the branching character 105 is caused to appear, and after the course change is completed, the branching character 105 may be eliminated from the virtual game space.

While the certain example embodiments herein have been described in detail, the foregoing description is in all aspects illustrative and not restrictive. It is understood that numerous other modifications and variations can be devised without departing from the scope of the invention.

What is claimed is:

1. A non-transitory computer readable storage medium having stored thereon a computer program executed by a computing system using an input device which incorporates a motion sensor for detecting a motion of the input device and is worn on the body of a player, and displaying a player object moving along a predetermined route on a course, which is set in a virtual three-dimensional space, in accordance with motion data detected by the input device, the course including at least one branch point at which the course branches off into a plurality of routes, the computer program comprising instructions configured to:

acquire motion data outputted by the motion sensor;

set a moving speed of the player object in accordance with the motion data;

set any one of the plurality of routes on the course as a non-player route along which a non-player object moves;

update a position of the non-player object along the non-player route;

set a branching direction of the player object at the branch point on the course in accordance with the motion data, the branching direction further based on an assertion of a predetermined condition between the player object and the non-player object;

set a route, on which the player object is to move along when the predetermined condition is satisfied, as a second route that is in accordance with the non-player route; and cause the player object to move along the second route on the course in accordance with the branching direction at the moving speed, wherein the predetermined condition is satisfied when a virtual distance in the virtual three-dimensional space between the player object and the non-player object is equal to or less than a predetermined distance and continues for a predetermined time period.

2. The medium of claim 1, wherein the instructions are further configured to locate the non-player object in the virtual three-dimensional space at a predetermined time.

3. The medium of claim 2, wherein the instructions are further configured to:

determine whether or not the player object has yet to arrive at or to pass through the branch point at which the course branches off and whether or not the player object exists in an area of the virtual three-dimensional space that is within a predetermined distance from the branch point; and locate the non-player object at a position close to the player object when the player object is determined to exist in the area.

4. The medium of claim 2, wherein the instructions are further configured to eliminate the non-player object, after the non-player object is located in the virtual three-dimensional space, when a distance between the non-player object and the player object becomes equal to or greater than a predetermined value.

5. The medium of claim 2, wherein the instructions are further configured to set a plurality of different non-player routes for a plurality of non-player objects, and cause the plurality of non-player objects, respectively having various visual appearances, to respectively move along the plurality of non-player routes.

6. The medium of claim 1, wherein the instructions are further configured to:

set any one of the routes on the course as a player route along which the player object moves; and change the player route to the non-player route when the predetermined condition is satisfied.

7. The medium of claim 6, wherein the instructions are further configured to locate the non-player object in the virtual three-dimensional space at a predetermined time.

8. The medium of claim 7, wherein the instructions are further configured to:

determine whether or not the player object has yet to arrive at or to pass through the branch point at which the course branches off and whether or not the player object exists in an area within a predetermined distance from the branch point, wherein the located non-player object is positioned at a position close to the player object when the player object is determined to exist in the area within the predetermined distance from the branch point.

9. The medium of claim 7, wherein the instructions are further configured to eliminate the non-player object, after the non-player object is located, when a distance between the non-player object and the player object becomes equal to or greater than a predetermined value.

10. The medium of claim 7, wherein the instructions are further configured to set a plurality of different non-player routes for a plurality of non-player objects, and cause the plurality of non-player objects, respectively having various visual appearances, to respectively move along the plurality of non-player routes.

11. The medium of claim 1, wherein the moving speed is set so as to increase in accordance with an increase in an oscillation frequency per unit time of the motion data.

12. The medium of claim 1, wherein:

the motion sensor is an acceleration sensor, and the oscillation frequency per unit time is based on a magnitude of an acceleration in a gravity direction associated with the acceleration sensor.

13. An apparatus configured to receive data from a motion sensor, the apparatus comprising:

at least one processor configured to:

display a virtual player object in a virtual world that includes a virtual course with at least first and second predetermined routes, wherein at least one branch point is a connection between the first and second routes;

receive motion data that is outputted by the motion sensor;

set a moving speed of the virtual player object based on the received motion data;

move the virtual player object along the first predetermined route;

associate a non-player object with the second predetermined route;

compare a status of the virtual player object against a status of the non-player object;

determine a branching direction of the player object at the branch point on the course based on the motion data and the compared statuses of the virtual player and non-player objects; and transition the virtual player object from the first predetermined route to the second predetermined route based on the determined branching direction, wherein the statuses of the virtual player and non-player objects includes a position and/or speed.

14. A computer implemented method executed by a computer system that includes at least one processor, the method comprising:

displaying a player object in a virtual world that includes at least one course that includes at least first and second predetermined tracks where the player object is configured to move through the course via the first and/or second predetermined track, the at least one course including a branch that operates to connect the first and second predetermined tracks to thereby allow the player object to switch between the respective tracks;

acquiring motion data from a motion sensor;

moving the player object at a moving speed along the first track, the moving speed based on the acquired motion data;

associating a non-player object with at least a portion of the first or second track;

moving the non-player object along the associated track;

determining a relationship between the non-player object and the player object;

determining a branch direction for the player object based on the acquired motion data and a comparison of the relationship to at least one predetermined condition; and moving the player object from the first track to the second track via the branch based on the determined branch direction, wherein the at least one predetermined condition includes:

1) a distance between the non-player and player object that is maintained for a predetermined period of time; or 2) maintaining the moving speed of the player object for a predetermined period of time.

15. The method of claim 14, wherein the associating includes creating the non-player object in the virtual world.

16. The method of claim 15, further comprising calculating a distance between a position of the player object and an area associated with the branch, wherein the creation of the non-player object is done based on the calculated distance.

17. The method of claim 14, further comprising removing the non-player object from the virtual world when a distance between the player object and the non-player object exceeds a predetermined threshold.

18. A computer system comprising:

at least one processor that is configured to:

display a player object in a virtual world that includes at least one course that includes at least first and second predetermined tracks where the player object is configured to move through the course via the first and/or second predetermined track, the at least one course including a branch that operates to connect the first and second predetermined tracks to thereby allow the player object to switch between the respective tracks;

acquire motion data from a motion sensor;

move the player object at a moving speed along the first track, the moving speed based on the acquired motion data;

associate a non-player object with at least a portion of the first or second track;

animate the non-player object along the first track at a position related to a moving direction of the player object;

determine a branch direction for the player object based on a status of the non-player object; and move the player object from the first track to the second track via the branch based on the determined branch direction, wherein the branch direction is further determined based on a comparison between the status of the non-player object and a status of the player object in relation to at least one predetermined condition, wherein at least one predetermined condition includes a distance between the non-player and player object that is maintained for a predetermined period of time.

19. The system of claim 18, wherein the at least one processor is further configured to animate the non-player object passing the player object.

* * * * *